(12) United States Patent
Matsuzaki et al.

(10) Patent No.: US 10,680,246 B2
(45) Date of Patent: Jun. 9, 2020

(54) BINDER FOR NONAQUEOUS ELECTROLYTE SECONDARY BATTERY ELECTRODE, MANUFACTURING METHOD THEREFOR AND USE THEREFOR

(71) Applicant: TOAGOSEI CO. LTD., Tokyo (JP)

(72) Inventors: Hideo Matsuzaki, Nagoya (JP); Naohiko Saito, Nagoya (JP); Kinuko Ogura, Nagoya (JP); Atsushi Nishiwaki, Nagoya (JP); Akitsugu Shibata, Nagoya (JP)

(73) Assignee: TOAGOSEI CO., LTD., Tokyo (JP)

( * ) Notice: Subject to any disclaimer, the term of this patent is extended or adjusted under 35 U.S.C. 154(b) by 0 days.

(21) Appl. No.: 15/532,672

(22) PCT Filed: Oct. 26, 2016

(86) PCT No.: PCT/JP2016/081666
§ 371 (c)(1),
(2) Date: Jun. 2, 2017

(87) PCT Pub. No.: WO2017/073589
PCT Pub. Date: May 4, 2017

(65) Prior Publication Data
US 2017/0352886 A1 Dec. 7, 2017

(30) Foreign Application Priority Data

Oct. 30, 2015 (JP) ................................ 2015-215086
Jan. 29, 2016 (JP) ................................ 2016-015991

(51) Int. Cl.
| H01M 4/62 | (2006.01) |
| H01M 4/13 | (2010.01) |
| H01M 10/0525 | (2010.01) |
| C08F 220/06 | (2006.01) |
| C08J 3/14 | (2006.01) |
| C09D 5/24 | (2006.01) |
| C09D 133/02 | (2006.01) |

(52) U.S. Cl.
CPC ........... *H01M 4/622* (2013.01); *C08F 220/06* (2013.01); *C08J 3/14* (2013.01); *C09D 5/24* (2013.01); *C09D 133/02* (2013.01); *H01M 4/13* (2013.01); *H01M 10/0525* (2013.01); *C08J 2333/02* (2013.01); *Y02T 10/7011* (2013.01)

(58) Field of Classification Search
CPC .............. H01M 4/62–622; H01M 10/02–0525
See application file for complete search history.

(56) References Cited

U.S. PATENT DOCUMENTS

| 4,722,958 | A | 2/1988 | Sauer et al. | |
| 6,632,561 | B1* | 10/2003 | Bauer | H01M 2/1673 |
| | | | | 204/296 |
| 2002/0034686 | A1* | 3/2002 | Yamakawa | H01M 4/621 |
| | | | | 429/217 |
| 2002/0068783 | A1* | 6/2002 | Maeda | H01M 4/62 |
| | | | | 524/474 |
| 2003/0091899 | A1* | 5/2003 | Matsubara | H01M 4/13 |
| | | | | 429/213 |
| 2003/0113626 | A1* | 6/2003 | Maeda | H01M 4/621 |
| | | | | 429/217 |
| 2004/0170900 | A1* | 9/2004 | Sumiya | H01M 4/06 |
| | | | | 429/303 |
| 2006/0228627 | A1* | 10/2006 | Nakayama | H01M 4/131 |
| | | | | 429/217 |
| 2006/0257739 | A1* | 11/2006 | Ryu | H01M 4/13 |
| | | | | 429/217 |
| 2007/0092796 | A1 | 4/2007 | Matsuda et al. | |
| 2009/0267028 | A1* | 10/2009 | Hoshiba | H01G 11/38 |
| | | | | 252/500 |
| 2013/0209876 | A1* | 8/2013 | Kang | H01M 4/131 |
| | | | | 429/211 |
| 2015/0155594 | A1* | 6/2015 | Lee | H01M 10/052 |
| | | | | 429/310 |

(Continued)

FOREIGN PATENT DOCUMENTS

| EP | 2 858 151 A1 | 4/2015 |
| JP | S61-053312 A | 3/1986 |
| JP | 2000-294247 A | 10/2000 |

(Continued)

OTHER PUBLICATIONS

May 1, 2018 Written Opinion issued in International Application No. PCT/JP2016/081666.
Apr. 25, 2017 Notice of Allowance issued in Japanese Patent Application No. 2017-513553.
Dec. 13, 2016 International Search Report issued in PCT/JP2016/081666.
Shoko Aoki et al., "Acrylic Acid-Based Copolymers as Functional Binder for Silicon/Graphite Composite Electrode in Lithium-Ion Batteries," Journal of the Electrochemical Society, (2015) 162 (12) A2245-A2249.

(Continued)

*Primary Examiner* — Jonathan G Leong
*Assistant Examiner* — Jacob Buchanan
(74) *Attorney, Agent, or Firm* — Oliff PLC

(57) ABSTRACT

Provided is a binder for a nonaqueous electrolyte secondary battery electrode. The binder contains a crosslinked polymer having a carboxyl group, or salt thereof, a use therefor, and a method for manufacturing a carboxyl group-containing crosslinked polymer or salt thereof for use in the binder. The crosslinked polymer contains a structural unit derived from an ethylenically unsaturated carboxylic acid monomer in the amount of 50 to 100 mass % of total structural units, and after the crosslinked polymer neutralized to a degree of a neutralization of 80 to 100 mol % has been subjected to water swelling in water and then dispersed in a 1 mass % NaCl aqueous solution, the particle diameter thereof is 0.1 to 7.0 µm in a volume-based median diameter.

21 Claims, No Drawings

(56) References Cited

U.S. PATENT DOCUMENTS

2015/0287993 A1* 10/2015 Komaba .............. C08G 18/025
429/217

FOREIGN PATENT DOCUMENTS

| JP | 2011-228296 A | 11/2011 |
| JP | 2015-018776 A1 | 5/2014 |
| WO | 2014/065407 A1 | 5/2014 |

OTHER PUBLICATIONS

May 24, 2019 Extended European Search Report Issued in European Patent Application No. 16859819.1.

* cited by examiner

BINDER FOR NONAQUEOUS ELECTROLYTE SECONDARY BATTERY ELECTRODE, MANUFACTURING METHOD THEREFOR AND USE THEREFOR

TECHNICAL FIELD

The present teachings relate to a binder for a nonaqueous electrolyte secondary battery electrode usable in lithium-ion secondary batteries and the like, a use therefor, and a method for manufacturing a carboxyl group-containing crosslinked polymer or salt thereof for use in the binder.

BACKGROUND ART

Lithium-ion secondary batteries are well known as examples of nonaqueous electrolyte secondary batteries. Lithium-ion secondary batteries are employed in smart phones, tablets, notebook computers and other mobile devices because they have superior energy density, output density, charge-discharge cycle characteristics and the like in comparison with other secondary batteries such as lead storage batteries, and they have contributed to reduction in size and weight and high performance of such devices. In terms of input-output characteristics, charging times and the like, however, they have not yet reached the level of performance required for secondary batteries for use in electrical vehicles and hybrid vehicles (vehicle-mounted secondary batteries). Therefore, research is being conducted to improve the charge-discharge characteristics at high current densities (high-rate characteristics) with the aim of increasing output and reducing time for charging nonaqueous electrolyte secondary batteries. Also, since high durability is also required for vehicle-mounted applications, compatibility with cycle characteristics is required. In particular, techniques are in demand for maintaining advanced cycle characteristics because the cycle characteristics are often reduced in designs that increase the energy density directly connected to cruising distance per charge by increasing, for instance, a thickness of the electrode mixture layer or using a high-capacity or high-voltage active material.

Nonaqueous electrolyte secondary batteries are also required to have excellent durability (cycle characteristics).

Nonaqueous electrolyte secondary batteries are composed of a pair of electrodes disposed with a separator in between and a nonaqueous electrolyte solution. Each electrode is formed of a collector and a mixture layer formed on a surface of the collector, and the mixture layer is formed by, for instance, coating and drying an electrode mixture layer composition (slurry) containing an active material and a binder and the like on the collector.

When high-rate charging/discharging is performed, the active material swells and contracts due to rapid occlusion and release of lithium ions. In order for the battery to exhibit excellent durability even under such conditions, a binder with strong binding ability is required in order to prevent breakdown of the electrode mixture layer, peeling from the collector and other deterioration accompanying charge-discharge cycling.

Meanwhile, in recent years, aqueous electrode mixture layer compositions have also been in increased demand for reasons such as environmental protection and cost reduction. In the context of lithium-ion secondary batteries, aqueous binders using styrene butadiene rubber (SBR) and carboxymethyl cellulose (CMC) are being used in electrode mixture layer compositions for negative electrodes that use carbon materials such as graphite as the active material. However, further improvements are needed to accommodate the advanced high-rate characteristics and cycle characteristics required for vehicle-mounted applications. Meanwhile, solvent-based binders of polyvinylidene fluoride (PVDF) and the like using organic solvents such as N-methyl-2-pyrrolidone (NMP) are preferred for positive electrodes of lithium-ion secondary batteries, and no aqueous binder has been proposed that fulfills the requirements discussed above.

Active materials such as graphite and hard carbon (HC) and other carbon-based materials including conductive aids such as Ketjen black (KC) and acetylene black (AB) are often used as components of lithium-ion secondary batteries. In general, these carbon-based materials have poor wettability by aqueous media, so as to obtain a uniform electrode mixture layer composition with excellent dispersion stability, an aqueous binder having an excellent dispersion stabilizing effect on these carbon-based materials is desired. When coated on a collector (metal foil), a mixture layer composition with excellent dispersion stability can form a highly smooth electrode mixture layer without defects such as spots and streaks. Moreover, an electrode mixture layer with superior conductivity is obtained when the active material, conductive aid and the like are uniformly dispersed.

The electrode manufacturing process includes steps such as rolling, rerolling, cutting and winding. When, for instance, the electrode mixture layer becomes detached from the collector in any of these steps, productivity (yield) declines due to contamination of the production line and production of defective products and the like. A binder that has strong binding ability and does not cause detachment of the mixture layer is therefore desired.

Under these circumstances, several aqueous binders applicable to lithium-ion secondary battery electrodes have been proposed.

Patent Literature 1 discloses an acrylic acid polymer crosslinked with a polyalkenyl ether as a binder for forming a negative electrode coating of a lithium-ion secondary battery. Patent Literature 2 describes obtaining an excellent capacity retention rate without breakdown of the electrode structure even using an active material containing silicon by using a polymer comprising polyacrylic acid crosslinked with a specific crosslinking agent as a binder. Patent Literature 3 discloses an aqueous secondary battery electrode binder, containing a water-soluble polymer with a specific aqueous solution viscosity comprising a structural unit derived from an ethylenically unsaturated carboxylic acid salt monomer and a structural unit derived from an ethylenically unsaturated carboxylic acid ester monomer.

CITATION LIST

Patent Literature 1 Japanese Patent Application Publication No. 2000-294247
Patent Literature 2 WO 2014/065407
Patent Literature 3 Japanese Patent Application Publication No. 2015-18776

SUMMARY

Patent Literature 1 and Patent Literature 2 both describe using a crosslinked polyacrylic acid as a binder, but the resulting electrodes had room for improvement in terms of flex resistance and the like. The binder described in Patent Literature 3 is satisfactory in terms of flexibility, but not satisfactory in terms of dispersion stability and binding ability.

In light of these circumstances, it is an object of the present teachings to provide a binder for a non-aqueous electrolyte secondary battery electrode, capable of yielding a mixture layer slurry with good dispersion stability and providing an electrode with excellent binding ability and flex resistance, together with a method for manufacturing a crosslinked polymer or salt thereof for use in this binder. It is another object of the present teachings to provide an electrode mixture layer composition for a nonaqueous electrolyte secondary battery and a non-aqueous electrolyte secondary battery electrode obtained by using this binder.

Solution to Technical Problem

The inventors discovered as a result of earnest researches aimed at solving these problems that an electrode obtained using a binder that contains a crosslinked polymer or salt thereof having a carboxyl group and has a sufficiently small particle diameter when neutralized and then dispersed in saline solution exhibits excellent binding ability and flex resistance. It has been also discovered that a mixture layer slurry containing the binder exhibits good dispersion stability. The present teachings have been perfected based on these findings.

The present teachings is as follows.
(1) A binder for a nonaqueous electrolyte secondary battery electrode, the binder comprising a crosslinked polymer having a carboxyl group, or salt thereof; wherein
the crosslinked polymer comprises a structure derived from an ethylenically unsaturated carboxylic acid monomer in an amount of 50 to 100 mass of total structural units of the crosslinked polymer, and
the particle diameter of the crosslinked polymer is 0.1 to 7.0 m in a volume-based median diameter, when the crosslinked polymer is neutralized to a degree of a neutralization of 80 to 100 mol %, subjected to water swelling in water, and then dispersed in a 1 mass % NaCl aqueous solution.
(2) The binder according to (1) above, wherein the crosslinked polymer is crosslinked with a crosslinkable monomer, and an amount of the crosslinkable monomer used is 0.02 to 0.7 mol % of the total amount of the non-crosslinkable monomers.
(3) The binder according to (2) above, wherein the crosslinkable monomer is a compound having a plurality of allyl ether groups in the molecule.
(4) The binder according to any one of (1) to (3) above, wherein the crosslinked polymer or salt thereof has a viscosity of 500 mPa·s or less in a 1 mass % aqueous solution and 5,000 mPa·s or more in a 3 mass % aqueous solution.
(5) A method for manufacturing a crosslinked polymer having a carboxyl group, or salt thereof for use in a binder for a nonaqueous electrolyte secondary battery electrode,
the method comprising polymerizing a monomer composition by precipitation-polymerizing, the monomer composition comprising ethylenically unsaturated carboxylic acid monomers in 50 to 100 mass %,
wherein
the particle diameter of the crosslinked polymer is 0.1 to 7.0 μm in a volume-based median diameter, when the crosslinked polymer is neutralized to a degree of a neutralization of 80 to 100 mol %, subjected to water swelling in water, and then dispersed in a 1 mass % NaCl aqueous solution.
(6) The method according to (5) above, wherein a polymerization medium comprising acetonitrile is used in the polymerizing.
(7) The method according to (5) or (6) above, wherein the degree of neutralization of the ethylenically unsaturated carboxylic acid monomer in the polymerizing is equal to or less than 10 mol %.
(8) The method according to any one of (5) to (7) above, comprising:
drying following the polymerizing, and
neutralizing the polymer following the polymerizing and before the drying, by adding an alkali compound to the polymer dispersion obtained in the polymerizing.
(9) The method according to any one of (5) to (8) above, comprising: solid-liquid separating; washing; and drying following the polymerizing.
(10) An electrode mixture layer composition for a nonaqueous electrolyte secondary battery, comprising the binder according to any one of (1) to (4) above, an active material, and water.
(11) The electrode mixture layer composition according to (10) above, further comprising a styrene/butadiene latex as a binder.
(12) The electrode mixture layer composition according to (10) or (11) above, comprising either a carbon material or a silicon material as a negative electrode active material.
(13) An electrode mixture layer composition according to (10) or (11) above, comprising a lithium-containing metal oxide as a positive electrode active material.
(14) A nonaqueous electrolyte secondary battery electrode, comprising, on a surface of a collector side, a mixture layer comprising the electrode mixture layer composition according to any one of (10) to (13) above.

Advantageous Effects of Teachings

The binder for a nonaqueous electrolyte secondary battery electrode of the present teachings can yield an electrode with good flex resistance because the binder has excellent binding ability and also excellent uniformity in the mixture layer. Consequently, it can yield an electrode that is resistant to detachment of the mixture layer due to high-rate charging and discharging cycle, and also has good durability (cycle characteristics). Moreover, because the electrode mixture layer composition for a nonaqueous electrolyte secondary battery of the present teachings has excellent dispersion stability of the active material and the like, it can yield a nonaqueous electrolyte secondary battery electrode having a uniform mixture layer and good electrode characteristics.

The present teachings will be explained in detail below. In this Description, "(meth)acrylic" means acrylic and/or methacrylic, and "(meth)acrylate" means acrylate and/or methacrylate. A "(meth)acryloyl group" is an acryloyl group and/or a methacryloyl group.

The binder for a nonaqueous electrolyte secondary battery electrode of the present teachings contains a crosslinked polymer or salt thereof, and can be mixed with an active material and water to obtain an electrode mixture layer composition. This composition may be a slurry that can be coated on the collector, or it may be prepared as a wet powder that can be pressed onto the collector surface. The nonaqueous electrolyte secondary battery electrode of the present teachings is obtained by forming a mixture layer from this composition on the surface of a copper foil, aluminum foil or the other collectors.

The binder for a nonaqueous electrolyte secondary battery electrode, the method for manufacturing a crosslinked polymer for use in the binder, and the electrode mixture layer composition for a nonaqueous electrolyte secondary battery obtained by the binder and nonaqueous electrolyte secondary battery electrode of the present teachings will be each explained in detail below.

(Binder)

The binder of the present teachings contains a crosslinked polymer having a carboxyl group or salt thereof. This crosslinked polymer contains a structural unit derived from an ethylenically unsaturated carboxylic acid monomer (hereunder referred to as "component (a)") in an amount of 50 to 100 mass %, or preferably 60 to 100 mass %, or more preferably 70 to 100 mass % of the total structural units. When the crosslinked polymer contains a structural unit derived from a crosslinkable monomer (described below), an upper limit of a content of the structural unit derived from the ethylenically unsaturated carboxylic acid monomer may be equal to or less than 99.95 mass %, or may be equal to or less than 99.0 mass %. When the crosslinked polymer has a carboxyl group, adhesion to the collector is improved, and the resulting electrode has low resistance and excellent high-rate characteristics due to the excellent ion conductivity and desolvation effect of the lithium ions. This also confers water swellability, which can increase the dispersion stability of active material and the like in the mixture layer composition. If the amount of the ethylenically unsaturated carboxylic acid monomer is less than 50 mass % as a percentage of the total structural units, dispersion stability, binding ability and battery durability may be inadequate.

The structural unit derived from an ethylenically unsaturated carboxylic acid monomer can be introduced by, for example, polymerizing monomers including an ethylenically unsaturated carboxylic acid monomer. It can also be obtained by first (co)polymerizing and then hydrolyzing a (meth)acrylic acid ester monomer. Alternatively, (meth) acrylamide, (meth)acrylonitrile and the like may be first polymerized and then treated with a strong alkali, or a polymer having a hydroxyl group may be reacted with an acid anhydride.

Examples of ethylenically unsaturated carboxylic acid monomers include (meth)acrylic acid; (meth)acrylamide alkyl carboxylic acids such as (meth)acrylamidohexanoic acid and (meth)acrylamidododecanoic acid; ethylenically unsaturated monomers having carboxyl groups, such as succinic acid monohydroxyethyl (meth)acrylate, ω-carboxy-caprolactone mono(meth)acrylate and ß-carboxyethyl (meth)acrylate, and (partial) alkali neutralization products of these, and one of these may be used alone, or a combination of two or more may be used. Of these, a compound having an acryloyl group is preferred because the polymerization rate is faster, resulting in a polymer with a long primary chain length and a binder with good binding ability, and acrylic acid is especially desirable. A polymer with a high carboxyl group content can be obtained when acrylic acid is used as the ethylenically unsaturated carboxylic acid monomer. Types of salts include alkali metal salts such as lithium, sodium and potassium salts; alkali earth metal salts such as calcium salts and barium salts; other metal salts such as magnesium salts and aluminum salts; and ammonium salts and organic amine salts and the like. Of these, alkali metal salts and magnesium salts are preferable because they are less likely to adversely affect the battery characteristics, and alkali metal salts are more preferable. Lithium salts are especially preferable as alkali metal salts.

The crosslinked polymer of the present teachings may contain, in addition to the component (a), a structural unit (hereunder referred to as "component (b)") derived from another ethylenically unsaturated monomer that is copolymerizable with the ethylenically unsaturated carboxylic acid monomer. Examples of the component (b) include structural units derived from ethylenically unsaturated monomer compounds having anionic groups other than carboxyl groups such as sulfonic acid and phosphoric acid groups, and structural units derived from non-ionic ethylenically unsaturated monomers and the like. These structural units may be introduced by copolymerizing an ethylenically unsaturated monomer compound having anionic groups other than carboxyl groups such as sulfonic acid and phosphoric acid groups or a monomer containing a non-ionic ethylenically unsaturated monomer. Of these, a structural unit derived from a non-ionic ethylenically unsaturated monomer is preferred as the component (b) from the standpoint of flex resistance.

When the component (b) is a structural unit derived from a non-ionic ethylenically unsaturated monomer, it constitutes preferably 1 to 50 mass %, or more preferably 5 to 40 mass %, or still more preferably 10 to 30 mass % of the total structural units of the crosslinked polymer. An upper limit of the component (b) may be equal to or less than 49.95 mass/%, or may be equal to or less than 49.9 mass %. When the polymer contains the component (b) in the amount of equal to or more than 1 mass %/o, it is easy to obtain an electrode with excellent flex resistance because the resulting mixture layer is more flexible. The effect of improving lithium ion conductivity is also anticipated because affinity with the electrolyte solution is improved. If the content is equal to or less than 50 mass %, the necessary amount of the component (a) can be secured.

When the crosslinked polymer has the component (b), the component (a) constitutes preferably 50 to 99 mass %, or more preferably 60 to 95 mass %, or still more preferably 70 to 90 mass % of the total structural units of the crosslinked polymer.

The non-ionic ethylenically unsaturated monomer is preferably (meth)acrylamide or a derivative thereof or the like in terms of excellent binding ability of the binder.

Examples of (meth)acrylamide derivatives include N-alkyl (meth)acrylamide compounds such as isopropyl (meth)acrylamide, t-butyl (meth)acrylamide, N-n-butoxymethyl (meth)acrylamide and N-isobutoxymethyl (meth)acrylamide; and N,N-dialkyl (meth)acrylamide compounds such as dimethyl (meth)acrylamide and diethyl (meth)acrylamide, and one of these or a combination of two or more may be used.

A (meth)acrylic acid ester for example may also be used as a non-ionic ethylenically unsaturated monomer.

Examples of (meth)acrylic acid esters include (meth) acrylic acid alkyl ester compounds such as methyl (meth) acrylate, ethyl (meth)acrylate, butyl (meth)acrylate, isobutyl (meth)acrylate and 2-ethylhexyl (meth)acrylate; (meth) acrylic acid cycloalkyl ester compounds such as cyclohexyl (meth)acrylate and methyl cyclohexyl (meth)acrylate; (meth)acrylic acid alkoxy alkyl ester compounds such as 2-methoxyethyl (meth)acrylate and ethoxyethyl (meth)acrylate; and (meth)acrylic acid hydroxyalkyl ester compounds such as hydroxyethyl (meth)acrylate, hydroxypropyl (meth) acrylate and hydroxybutyl (meth)acrylate and the like, and one of these or a combination of two or more may be used.

When a (meth)acrylic acid ester is used as a non-ionic ethylenically unsaturated monomer, the structural units derived from the (meth)acrylic acid ester constitute preferably 1 to 30 mass %, or more preferably 5 to 30 mass %, or still more preferably 10 to 30 mass % of the total structural units of the crosslinked polymer. In this case, the component (a) constitutes preferably 70 to 99 mass %, or more preferably 70 to 95 mass %, or still more preferably 70 to 90 mass % of the total structural units of the crosslinked polymer.

Of these, compounds having ether bonds, including alkoxy alkyl (meth)acrylates such as 2-methoxyethyl (meth)acrylate and ethoxyethyl (meth)acrylate, are preferred for obtaining high lithium-ion conductivity and further improving the high-rate characteristics, and 2-methoxyethyl (meth)acrylate is more preferable.

Of the non-ionic ethylenically unsaturated monomers, a compound having an acryloyl group is preferable because the polymerization rate is faster, resulting in a polymer with a long primary chain length and a binder with good binding ability.

The non-ionic ethylenically unsaturated monomer is preferably a compound with a glass transition temperature (Tg) of equal to or lower than 0° C. of the homopolymer in terms of good flex resistance of the obtained electrode.

The crosslinking method in the crosslinked polymer of the present teachings is not particularly limited, and the following methods will be given as examples.

1) Copolymerizing a crosslinkable monomer
2) Using chain transfer to the polymer chain during radical polymerization
3) Synthesizing polymer having reactive functional groups, adding a crosslinking agent thereto as necessary, and then crosslinking the polymers Of these, a method of copolymerizing a crosslinkable monomer is preferable because the operations are easy and it is easy to control a degree of crosslinking.

Examples of crosslinkable monomers include polyfunctional polymerizable monomers having two or more polymerizable unsaturated groups, and monomers having self-crosslinkable functional groups such as hydrolyzable silyl groups and the like.

The polyfunctional polymerizable monomers are compounds having two or more polymerizable functional groups such as (meth)acryloyl or alkenyl groups in the molecule, and examples include polyfunctional (meth)acrylate compounds, polyfunctional alkenyl compounds, and compounds having both (meth)acryloyl and alkenyl groups and the like. One of these compounds may be used alone, or a combination of two or more may be used. Of these, a polyfunctional alkenyl compound is preferable for ease of obtaining a uniform crosslinked structure, and a polyfunctional allyl ether compound having a plurality of allyl ether groups in the molecule is especially preferable.

Examples of polyfunctional (meth)acrylate compounds include di(meth)acrylates of dihydric alcohols, such as ethylene glycol di(meth)acrylate, propylene glycol di(meth)acrylate, 1,6-hexanediol di(meth)acrylate, polyethylene glycol di(meth)acrylate and polypropylene glycol di(meth)acrylate; tri(meth)acrylates of trihydric and higher polyhydric alcohols, such as trimethylolpropane tri(meth)acrylate, trimethylolpropane ethylene oxide modified tri(meth)acrylate, glycerin tri(meth)acrylate, pentaerythritol tri(meth)acrylate and pentaerythritol tetra(meth)acrylate; poly(meth)acrylates such as tetra(meth)acrylate and bisamides such as methylene bisacrylamide and hydroxyethylene bisacrylamide and the like.

Examples of polyfunctional alkenyl compounds include polyfunctional allyl ether compounds such as trimethylolpropane diallyl ether, trimethylolpropane triallyl ether, pentaerythritol diallyl ether, pentaerythritol triallyl ether, tetraallyl oxyethane and polyallyl saccharose; polyfunctional allyl compounds such as diallyl phthalate; and polyfunctional vinyl compounds such as divinyl benzene and the like.

Examples of compounds having both (meth)acryloyl and alkenyl groups include allyl (meth)acrylate, isopropenyl (meth)acrylate, butenyl (meth)acrylate, pentenyl (meth)acrylate and 2-(2-vinyloxyethoxy)ethyl (meth)acrylate and the like.

Specific examples of the monomers having self-crosslinkable functional groups include vinyl monomers containing hydrolysable silyl groups, and N-methylol (meth)acrylamide, N-methoxyalkyl (meth)acrylate and the like. One of these compounds or a mixture of two or more may be used.

The vinyl monomers containing hydrolysable silyl groups are not particularly limited as long as they are vinyl monomers having at least one hydrolysable silyl group. Examples include vinyl silanes such as vinyl trimethoxysilane, vinyl triethoxysilane, vinyl methyl dimethoxysilane and vinyl dimethyl methoxysilane; acrylic acid esters containing silyl groups, such as trimethoxysilylpropyl acrylate, triethoxysilylpropyl acrylate and methyl dimethoxysilylpropyl acrylate; methacrylic acid esters containing silyl groups, such as trimethoxysilylpropyl methacrylate, triethoxysilylpropyl methacrylate, methyl dimethoxysilylpropyl methacrylate and dimethyl methoxysilylpropyl methacrylate; vinyl ethers containing silyl groups, such as trimethoxysilylpropyl vinyl ether; and vinyl esters containing silyl groups, such as vinyl trimethoxysilyl undecanoate and the like.

When the crosslinked polymer of the teachings is crosslinked with a crosslinkable monomer, the amount of the crosslinkable monomer used is preferably 0.02 to 0.7 mol %, or more preferably 0.03 to 0.4 mol % of the total amount of the monomers (non-crosslinkable monomers) other than the crosslinkable monomer. The amount of the crosslinkable monomer is preferably equal to or more than 0.02 mol % because this results in good binding ability and greater stability of the mixture layer slurry. If the amount is equal to or less than 0.7 mol %, the crosslinked polymer tends to be more stable.

Furthermore, the amount of the crosslinkable monomer used is preferably 0.05 to 5 mass %, or more preferably 0.1 to 4 mass %, or still more preferably 0.2 to 3 mass %, or even more preferably 0.3 to 2 mass % of the total constituent monomers of the crosslinked polymer.

To exert good binding ability with a binder containing the crosslinked polymer, the crosslinked polymer is preferably well dispersed in the mixture layer composition in a form of water-swollen particles of a suitable particle diameter. This is because when secondary aggregates of the crosslinkable polymer do not break up but persist as large-particle-size clumps, the dispersion stability of the slurry becomes insufficient, and the binder (crosslinked polymer) is nonuniformly present in the mixture layer, so that adequate binding ability may not be obtained and battery performance may be adversely affected. Even if the primary particles are dispersed without secondary aggregation, moreover, there is a similar risk that adequate binding ability may not be obtained if the particle size is too large.

When the crosslinked polymer or salt thereof of the present teachings having a degree of neutralization of 80 to 100 mol % based on the carboxyl groups of the crosslinked polymer is subjected to water swelling in an aqueous medium and dispersed in a 1.0 mass % NaCl aqueous solution, the particle diameter thereof is preferably in a range of 0.1 to 7.0 µm in a volume-based median diameter. This particle diameter is more preferably in the range of 0.5 to 5.0 µm, or still more preferably in the range of 1.0 to 4.0 µm, or yet more preferably in the range of 1.0 to 3.0 µm. If the particle diameter is in the range of 0.1 to 7.0 µm, because the crosslinked polymer or salt thereof is uniformly present at a suitable size in the mixture layer composition, the resulting mixture layer composition is highly stable and can have excellent binding ability. Binding ability may be insufficient if the particle diameter exceeds 7.0 µm for the reasons discussed above, and manufacturing stability is a concern if the particle diameter is less than 0.1 µm.

If the crosslinked polymer is unneutralized or the degree of neutralization is less than 80 mol %, it is neutralized to a degree of neutralization of 80 to 100 mol % with an alkali metal hydroxide in an aqueous medium and subjected to thorough water swelling, after which the particle diameter is measured with the polymer similarly dispersed in a 1.0 mass % NaCl aqueous solution. In general, when a crosslinked polymer or salt thereof is in a form of a powder or solution (liquid dispersion), the primary particles are often present as associated or aggregated bulk particles. Because the crosslinked polymer or salt thereof of the present teachings has extremely good dispersibility, the bulk particles are broken up when it is neutralized to a degree of neutralization of 80 to 100 mol % and subjected to water swelling resulting in a stable dispersed state formed substantially of dispersed primary particles.

Thus, the crosslinked polymer or salt thereof of the present teachings has good dispersibility, and can be stably dispersed in the form of water-swollen particles of a suitable diameter in the mixture layer composition (aqueous medium). However, scattered light may not be obtained with the particles in a water-swollen state, making it impossible to measure the particle diameter directly in an aqueous medium. The particle diameter can be measured by adding the particles to the aforementioned NaCl aqueous solution and shielding charge of the polymer because this suppresses water swelling.

If the crosslinked polymer or salt thereof disperses stably in a medium in the form of primary particles of a suitable particle diameter, or if it disperses in the medium in the form of particles of a suitable particle diameter because any secondary aggregated particles are easily broken up, uniformity in the mixture layer is high and excellent binding ability and flex resistance can be obtained. The crosslinked polymer or salt thereof of the present teachings can be obtained for example by methods described below as methods for manufacturing the crosslinked polymer or salt thereof.

In general, toughness of a crosslinked polymer increases as a length of the polymer chain (primary chain length) increases, allowing for greater binding ability and increasing a viscosity of an aqueous dispersion. Moreover, a crosslinked polymer (salt) obtained by applying a relatively small amount of crosslinking to a polymer with a long primary chain length exists in water in a form of a water-swollen microgel. In the electrode mixture layer composition of the present teachings, thickening effects and dispersion stabilizing effects are obtained through interaction of the microgel. The interactions of the microgel differ depending on the degree of water swelling of the microgel and strength of the microgel, and these are affected by the degree of crosslinking of the crosslinked polymer. If the degree of crosslinking is too low, the microgel may not be strong enough, and the dispersion stabilizing effect and binding ability may be insufficient as a result. If the degree of crosslinking is too great, on the other hand, the dispersion stabilizing effect and binding ability may be insufficient because the microgel does not swell sufficiently. That is, the crosslinked polymer is preferably a slightly-crosslinked polymer obtained by subjecting a polymer with a sufficiently long primary chain length to a suitable degree of crosslinking.

In the mixture layer composition, the crosslinked polymer or salt thereof of the present teachings is preferably used in a form of a salt in which acid groups including carboxyl groups derived from the ethylenically unsaturated carboxylic acid monomer have been neutralized so that the degree of neutralization is 20 to 100 mol %. The degree of neutralization is more preferably 50 to 100 mol %, or still more preferably 60 to 95 mol %. A degree of neutralization of equal to or more than 20 mol % is preferable for obtaining good water swellability and a dispersion stabilization effect.

The viscosity of the crosslinked polymer or salt thereof of the present teachings is preferably equal to or less than 500 mPa·s in a 1 mass % aqueous solution and equal to or more than 5,000 mPa·s in a 3 mass % aqueous solution. The viscosity of 1 mass % aqueous solution is more preferably equal to or less than 300 mPa·s, or still more preferably equal to or less than 100 mPa·s. The viscosity of a 3 mass % aqueous solution is more preferably equal to or more than 10,000 mPa·s, or still more preferably equal to or more than 30,000 mPa·s.

If the viscosity of a 1 mass % aqueous solution is equal to or less than 500 mPa·s, good coating properties are obtained because the viscosity of the mixture layer composition (described below) is sufficiently low. From a standpoint of binding ability, the viscosity of a 1 mass % aqueous solution is preferably equal to or more than 1 mPa·s.

If the viscosity of a 3 mass % aqueous solution is equal to or more than 50,000 mPa·s, stability of the mixture layer composition is ensured, and good binding ability is obtained. From a standpoint of the coating properties, the viscosity of the 3 mass % aqueous solution is preferably equal to or less than 1,000,000 mPa·s.

In water, the crosslinked polymer or salt thereof of the present teachings absorbs water and becomes swollen. Therefore, the viscosity of the aqueous solution rises rapidly as the concentration of the aqueous solution rises and the crosslinked polymer becomes sufficiently packed.

In general, when a crosslinked polymer has a suitable degree of crosslinking, the greater the amount of hydrophilic groups in the crosslinked polymer, the more the crosslinked polymer absorbs water and the more easily becomes swollen. In terms of degree of crosslinking, the lower the degree of crosslinking, the more easily the crosslinked polymer swells. It should be noted that even if a number of crosslinking points is the same, swelling of the crosslinked polymer is more difficult as the molecular weight (primary chain length) is greater because more of the crosslinking points contribute to formation of three-dimensional networks. Thus, viscosities of 1 mass % aqueous solution and 3 mass % aqueous solution can be regulated by adjusting amount of hydrophilic groups in the crosslinked polymer, a number of crosslinking points, a primary chain length and the like. In this occasion, the number of crosslinking points can be adjusted by, for example, changing an amount of the crosslinkable monomer, a chain transfer reaction to the polymer chain and post-crosslinking reactions and the like. Further, the primary chain length of the polymer can be adjusted by setting conditions that affect an amount of generated radicals, such as a kind of an initiator and polymerization temperature, and by selecting the polymerization solvent and the like, with chain transfer or the like being considered.

Because the aqueous solution viscosity strongly affects the viscosity of the mixture layer composition, a mixture layer composition with excellent coating properties even at a high concentration can be obtained by using a crosslinked polymer (salt) having the viscosity characteristics described above as a binder. Moreover, when the degree of crosslinking, molecular weight and the like of the crosslinked polymer or salt thereof have been adjusted to satisfy the above-described viscosity characteristics, greater peeling strength of the mixture layer can be obtained because the crosslinked polymer or salt thereof provides excellent binding ability as a binder.

(Method for Manufacturing Crosslinked Polymer or Salt Thereof)

A known polymerization method such as solution polymerization, precipitation polymerization, suspension polymerization or inverse-phase emulsification polymerization may be used for the crosslinked polymer of the present teachings, but precipitation polymerization and suspension polymerization (inverse-phase suspension polymerization) are preferable for reasons of productivity. Precipitation polymerization is more preferable for obtaining good performance in terms of binding ability and the like.

Precipitation polymerization is a method of manufacturing a polymer by performing a polymerization reaction in a solvent that dissolves the starting material (unsaturated monomer) but effectively does not dissolve the resulting polymer. As polymerization progresses, the polymer particles grow larger by aggregation and polymer growth, and a dispersion of secondary polymer particles is obtained, in which primary particles of tens of nanometers to hundreds of nanometers are aggregated to the secondary polymer particles of micrometers to tens of micrometers in size. Such secondary aggregation can also be suppressed by selecting a dispersion stabilizer, a polymerization solvent and the like. In general, precipitation polymerization in which secondary aggregation is suppressed is also referred to as dispersion polymerization.

In a case of precipitation polymerization, the polymerization solvent may be selected from water and various organic solvents and the like depending on a type of monomer used and the like. To obtain a polymer with a longer primary chain length, it is desirable to use a solvent with a small chain transfer constant.

Specific examples of the polymerization solvents include water-soluble solvents such as methanol, t-butyl alcohol, acetone, acetonitrile and tetrahydrofuran, and benzene, ethyl acetate, dichloroethane, n-hexane, cyclohexane and n-heptane and the like, and one of these or a combination of two or more may be used. Mixed solvents of any of these with water may also be used. In the present teachings, a water-soluble solvent means one having a solubility of more than 10 g/100 ml in water at 20° C.

Of these solvents, acetonitrile is preferred because, for example, polymerization stability is good, with less production of coarse particles and adhesion to the reaction vessel, because the precipitated polymer fine particles are less liable to secondary aggregation (or any secondary aggregates that occur are easily broken up in an aqueous medium), because the chain transfer constant is low, resulting in a polymer with a high degree of polymerization (long primary chain length), and because an operation is easier in a process neutralization described below.

To achieve a stable and rapid neutralization reaction during this process neutralization, moreover, it is desirable to add a small amount of a high polar solvent to the polymerization solvent. Desirable examples of this highly polar solvent are water and methanol. The amount of the highly polar solvent used is preferably 0.05 to 10.0 mass %, or more preferably 0.1 to 5.0 mass %, or still more preferably 0.1 to 1.0 mass % based on the total mass of the medium. If the ratio of the highly polar solvent is equal to or more than 0.05 mass %, the effect on the neutralization reaction is achieved, while if it is equal to or less than 10.0 mass %, there is no adverse effect on the polymerization reaction. When polymerizing a highly hydrophilic ethylenically unsaturated carboxylic acid monomer such as acrylic acid, moreover, adding a highly polar solvent serves to increase the polymerization rate and make it easier to obtain a polymer with a long primary chain length. Of the highly polar solvents, water in particular is desirable because it has a strong enhancing effect on the polymerization rate.

The manufacturing method of the present teachings preferably comprises a polymerization step in which a monomer component comprising an ethylenically unsaturated carboxylic acid monomer in the amount of 50 to 100 mass % is precipitation polymerized. A structural unit (component (a)) derived from an ethylenically unsaturated carboxylic acid monomer is introduced into the crosslinked polymer by this polymerization step in the amount of 50 to 100 mass %. The amount of the ethylenically unsaturated carboxylic acid monomer used is more preferably 60 to 100 mass %, or still more preferably 70 to 100 mass %.

The ethylenically unsaturated carboxylic acid monomer may be in an unneutralized state, or in the form of a neutralized salt. It may also be in the form of a partially neutralized salt in which part of the ethylenically unsaturated carboxylic acid monomer has been neutralized. Since the polymerization rate is high, the degree of neutralization of the ethylenically unsaturated carboxylic acid monomer is preferably not more than 10 mol %, or more preferably not more than 5 mol %, or still more preferably the monomer is not neutralized from the standpoint of obtaining a polymer with a high molecular weight and excellent binding ability.

In addition to the ethylenically unsaturated carboxylic acid monomer, another ethylenically unsaturated monomer that is copolymerizable with the ethylenically unsaturated carboxylic acid monomer may be included as a monomer component in the manufacturing method of the present teachings. The ethylenically unsaturated monomer may be for example an ethylenically unsaturated monomer compound having an anionic group other than a carboxyl group, such as a sulfonic acid group or phosphoric acid group, or a non-ionic ethylenically unsaturated monomer or the like. Of these, a structural unit derived from a non-ionic ethylenically unsaturated monomer is preferable from the standpoint of flex resistance. The non-ionic ethylenically unsaturated monomer may be contained in the amount of 1 to 50 mass %, or preferably 5 to 40 mass %, or more preferably 10 to 30 mass % of the total amount of the monomer components. The upper limit of the component (b) may be equal to or more than 49.95 mass %, or equal to or less than 49.9 mass %.

When the polymer contains the component (b) in the amount of equal to or more than 1 mass %/o, the monomers described above as monomers constituting the component (b) may be used as non-ionic ethylenically unsaturated monomers for obtaining a mixture layer with greater flexibility, but (meth)acrylamide and its derivatives and the like are preferred for obtaining a binder with excellent binding ability.

A (meth)acrylic acid ester for example may also be used as a non-ionic ethylenically unsaturated monomer. When a (meth)acrylic acid ester is used, the amount of the (meth) acrylic acid ester used is preferably 1 to 30 mass %, or more preferably 5 to 30 mass %, or still more preferably 10 to 30 mass % of the total amount of the monomer components.

A known polymerization initiator such as an azo compound, organic peroxide or inorganic peroxide may be used as a polymerization initiator, without any particular restrictions. The conditions of use may be adjusted to achieve a suitable amount of radical generation, using a known method such as thermal initiation, redox initiation using a reducing agent, UV initiation or the like. To obtain a crosslinked polymer with a long primary chain length, the conditions are preferably set so as to reduce the amount of radical generation within the allowable range of manufacturing time.

Examples of the azo compound include 2,2'-azobis(2,4-dimethylvaleronitrile), 2,2'-azobis(N-butyl-2-methylpropionamide), 2-(tert-butylazo)-2-cyanopropane, 2,2'-azobis(2,4, 4-trimethylpentane) and 2,2'-azobis(2-methylpropane), and one of these or a combination of two or more may be used.

Examples of the organic peroxide include 2,2-bis(4,4-di-t-butylperoxycyclohexyl) propane (product name "Pertetra A" by NOF Corporation), 1,1-di(t-hexylperoxy) cyclohexane (product name "Perhexa HC" by NOF Corporation), 1,1-di(t-butylperoxy) cyclohexane (product name "Perhexa C" by NOF Corporation), n-butyl-4,4-di(t-butylperoxy) valerate (product name "Perhexa V" by NOF Corporation), 2,2-di(t-butylperoxy)butane (product name "Perhexa 22" by NOF Corporation), t-butylhydroperoxide (product name "Perbutyl H" by NOF Corporation), cumene hydroperoxide (product name "Percumyl H" by NOF Corporation), 1,1,3, 3-tetramethylbutyl hydroperoxide (product name "Perocta H" by NOF Corporation), t-butylcumyl peroxide (product name "Perbutyl C" by NOF Corporation), di-t-butyl peroxide (product name "Perbutyl D" by NOF Corporation), di-t-hexyl peroxide (product name "Perhexyl D" by NOF Corporation), di(3,5,5-trimethylhexanoyl) peroxide (product name "Peroyl 355" by NOF Corporation), dilauroyl peroxide (product name "Peroyl L" by NOF Corporation), bis(4-t-butylcyclohexyl) peroxydicarbonate (product name "Peroyl TCP" by NOF Corporation), di-2-ethylhexyl peroxydicarbonate (product name "Peroyl OPP" by NOF Corporation), di-sec-butyl peroxydicarbonate (product name "Peroyl SBP" by NOF Corporation), cumyl peroxyneodecanoate (product name "Percumyl ND" by NOF Corporation), 1,1,3,3-tetramethylbutyl peroxyneodecanoate (product name "Perocta ND" by NOF Corporation), t-hexyl peroxyneodecanoate (product name "Perhexyl ND" by NOF Corporation), t-butyl peroxyneodecanoate (product name "Perbutyl ND" by NOF Corporation), t-butyl peroxyneoheptanoate (product name "Perbutyl NHP" by NOF Corporation), t-hexyl peroxypivalate (product name "Perhexyl PV" by NOF Corporation), t-butyl peroxypivalate (product name "Perbutyl PV" by NOF Corporation), 2,5-dimethyl-2, 5-di(2-ethylhexanoyl) hexane (product name "Perhexa 250" by NOF Corporation), 1,1,3,3-tetramethylbutylperoxy-2-ethylhexanoate (product name "Perocta O" by NOF Corporation), t-hexylperoxy-2-ethylhexanoate (product name "Perhexyl O" by NOF Corporation), t-butylperoxy-2-ethylhexanoate (product name "Perbutyl O" by NOF Corporation), t-butyl peroxylaurate (product name "Perbutyl L" by NOF Corporation), t-butyl peroxy-3,5,5-trimethylhexanoate (product name "Perbutyl 355" by NOF Corporation), t-hexylperoxyisopropyl monocarbonate (product name "Perhexyl I" by NOF Corporation), t-butylperoxyisopropyl monocarbonate (product name "Perbutyl I" by NOF Corporation), t-butyl-peroxy-2-ethyl hexyl monocarbonate (product name "Perbutyl E" by NOF Corporation), t-butyl peroxyacetate (product name "Perbutyl A" by NOF Corporation), t-hexyl peroxybenzoate (product name "Perhexyl Z" by NOF Corporation) and t-butyl peroxybenzoate (product name "Perbutyl Z" by NOF Corporation) and the like. One of these or a combination of two or more may be used.

Examples of the inorganic peroxide include potassium persulfate, sodium persulfate and ammonium persulfate.

When using a redox initiator, sodium sulfite, sodium thiosulfate, sodium formaldehyde sulfoxylate, ascorbic acid, sulfite gas ($SO_2$), ferrous sulfate or the like can be used as the reducing agent.

The polymerization initiator is preferably used in the amount of 0.001 to 2 mass parts, or more preferably 0.005 to 1 mass parts, or still more preferably 0.01 to 0.1 mass parts given 100 mass parts as the total amount of the monomer components used. If the amount of the polymerization initiator is equal to or more than 0.001 mass parts, a stable polymerization reaction can be achieved, while if it is equal to or less than 2 mass parts a polymer with a long primary chain length can be easily obtained.

Regarding the concentration of the monomer components during polymerization, a higher concentration is preferable for obtaining a polymer with a longer primary chain length. If the concentration of the monomer components is too high, however, aggregation of polymer particles tends to progress, the polymerization heat is difficult to control, and a runaway polymerization reaction is possible. Consequently, the monomer concentration at the start of polymerization is generally in the range of about 2 to 30 mass %, or preferably 5 to 30 mass %.

The polymerization temperature depends on the conditions such as the type and concentration of the monomer used, but is preferably 0° C. to 100° C. or more preferably 20° C. to 80° C. The polymerization temperature may be constant, or may change during the course of the polymerization reaction. The polymerization time is preferably 1 minute to 20 hours, or more preferably 1 hour to 10 hours.

The target crosslinked polymer may be obtained in a powder state by applying reduced pressure and/or heat treatment or the like in a drying step to remove the solvent from the crosslinked polymer dispersion obtained through the polymerization step. Following the polymerization step but before the drying step, a solid-liquid separation step such as centrifugation or filtration or a washing step using an organic solvent or a mixture of an organic solvent and water may be included with the aim of removing unreacted monomers (and their salts).

When the washing step is included, even if the crosslinked polymer has undergone secondary aggregation the aggregates are easily broken up, and good performance is obtained in terms of binding ability and battery characteristics because any remaining unreacted monomers are removed.

When an unneutralized monomer or partially neutralized salt is used as the ethylenically unsaturated carboxylic acid monomer in the manufacturing method of the present teachings, an alkali compound can be added to the polymer dispersion obtained from the polymerization step to neutralize the polymer (hereunder referred to as "process neutralization"), after which the solvent can be removed in a drying step. Alternatively, a powder of the crosslinked polymer can first be obtained in an unneutralized or partially neutralized salt state, after which an alkali compound can be added when preparing the electrode mixture layer slurry to neutralize the polymer (hereunder referred to as "post-neutralization"). Of these, process neutralization is preferable because it tends to make the secondary aggregates easier to break up.

(Electrode Mixture Layer Composition for a Nonaqueous Electrolyte Secondary Battery)

The electrode mixture layer composition for a nonaqueous electrolyte secondary battery of the present teachings contains a binder containing the crosslinked polymer or salt thereof together with an active material and water.

The amount of the crosslinked polymer or salt thereof used in the electrode mixture layer composition of the present teachings is 0.1 to 20 mass %, or preferably 0.2 to 10 mass %, or more preferably 0.3 to 8 mass %, or still more preferably 0.5 to 5 mass % of the total amount of the active material. If the amount of the crosslinked polymer or salt thereof is less than 0.1 mass %, sufficient binding ability may not be obtained. Moreover, dispersion stability of the active material and the like may be inadequate, detracting from the uniformity of the formed mixture layer. If the amount of the crosslinked polymer or salt thereof exceeds 20 mass %, on the other hand, the electrode mixture layer composition may become highly viscous, and coating performance on the collector may decrease. Consequently, spots and irregularities may occur in the resulting mixture layer, adversely affecting the electrode characteristics. Interface resistance may also increase, detracting from the high-rate characteristics.

If the amount of the crosslinked polymer and salt thereof is within the aforementioned range, a composition with excellent dispersion stability can be obtained, and it is also possible to obtain a mixture layer with extremely high adhesiveness to the collector, resulting in improved battery durability. Moreover, because the crosslinked polymer and salt thereof has sufficient ability to bind the active material even in a small quantity (such as 5 mass % or less), and because it has carboxy anions, it can yield an electrode with little interface resistance and excellent high-rate characteristics.

Of the active materials described above, lithium salts of transition metal oxides are principally used as positive electrode active materials, and for example laminar rock salt-type and spinel-type lithium-containing metal oxides may be used. Specific compounds that are laminar rock salt-type positive electrode active materials include lithium cobaltate, lithium nickelate, and NCM $\{Li(Ni_x,Co_y,Mn_z), x+y+z=1\}$ and NCA $\{Li(Ni_{1-a-b}Co_aA_b)\}$ and the like, which are referred to as ternary materials. Examples of spinel-type positive electrode active materials include lithium manganate and the like. Apart from oxides, phosphate salts, silicate salts and sulfur and the like may also be used. Examples of phosphate salts include olivine-type lithium iron phosphate and the like. One of these may be used alone as a positive electrode active material, or two or more may be combined and used as a mixture or composite.

When a positive electrode active material containing a laminar rock salt-type lithium-containing metal oxide is dispersed in water, the dispersion exhibits alkalinity because the lithium ions on the surface of the active material are exchanged for hydrogen ions in the water. There is thus the risk of corrosion of aluminum foil (Al) or the like, which is a common positive electrode collector material. In such cases, it is desirable to neutralize the alkali component eluted from the active material by using an unneutralized or partially neutralized crosslinked polymer as the binder. The amount of the unneutralized or partially neutralized crosslinked polymer used is preferably such that the amount of unneutralized carboxyl groups in the crosslinked polymer is equal to or more than the amount of alkali eluted from the active material.

Because all the positive electrode active materials have low electrical conductivity, a conductive aid is normally added and used. Examples of conductive aids include carbon materials such as carbon black, carbon nanotubes, carbon fiber, graphite fine powder, and carbon fiber. Of these, carbon black, carbon nanotubes and carbon fiber are preferable to make it easier to obtain excellent conductivity. As the carbon black, ketjen black and acetylene black are preferable. One of these conductive aids may be used alone, or a combination of two or more may be used. The amount of the conductive aid used is preferably 2 to 20 mass %, or more preferably 2 to 10 mass % of the total amount of the active material in order to achieve both conductivity and energy density.

The positive electrode active material may also be a conductive carbon material that has been surface coated.

Examples of negative electrode active materials include carbon materials, lithium metal, lithium alloys, metal oxides and the like, and one of these or a combination of two or more may be used. Of these, an active material formed of a carbon material such as natural graphite, artificial graphite, hard carbon, and soft carbon (hereunder referred to as a "carbon-based active material") is preferred, and hard carbon or a graphite such as natural graphite or artificial graphite is more preferred. In the case of graphite, spheroidized graphite is desirable from the standpoint of battery performance, and the particle size thereof is preferably in the range of 1 to 20 μm, or more preferably 5 to 15 μm.

To increase the energy density, metals, metal oxides or the like capable of occluding lithium, such as silicon and tin, may also be used as negative electrode active materials. Of these, silicon has a higher capacity than graphite, and an active material formed of a silicon material such as silicon, a silicon alloy or a silicon oxide such as silicon monoxide (SiO) (hereunder referred to as a "silicon-based active material") may be used. Although these silicon-based active materials have high capacities, however, the volume change accompanying charging and discharging is large. Therefore, they are preferably used in combination with the aforementioned carbon-based active materials. In this case, a large compounded amount of the silicon active material can cause breakdown of the electrode material, greatly detracting from the cycle characteristics (durability). From this perspective, when a silicon-based active material is included, the amount thereof is preferably equal to or less than 60 mass %, or more preferably equal to or less than 30 mass % of the amount of the carbon-based active material.

Because carbon-based active materials themselves have good electrical conductivity, it may not be necessary to add a conductive aid. When a conductive aid is added to further reduce resistance or the like, the amount thereof is preferably not more than 10 mass %, or more preferably equal to or less than 5 mass % of the total amount of the active material from the standpoint of energy density.

When the electrode mixture layer composition for a nonaqueous electrolyte secondary battery is in slurry form, the amount of the active material used is in the range of preferably 10 to 75 mass %, or more preferably 30 to 65 mass % of the total amount of the composition. An amount of the active material of equal to or more than 10 mass % is advantageous for suppressing migration of the binder and the like, and also because of drying costs of the medium. If the amount is not more than 75 mass %, on the other hand, it is possible to ensure the flowability and coating performance of the composition, and to form a uniform mixture layer.

When the electrode mixture layer composition is prepared in a wet powder state, the amount of the active material used is in the range of preferably 60 to 97 mass %, or more preferably 70 to 90 mass % of the total amount of the composition.

From the standpoint of energy density, non-volatile components other than the active material, such as the binder and conductive aid, are preferably used in the smallest amounts possible within which necessary binding ability and conductivity are ensured.

The electrode mixture layer composition for a nonaqueous electrolyte secondary battery of the present teaching uses water as a medium. To adjust the properties such as drying properties of the composition, it is also possible to use a mixed solvent of water with a water-soluble organic solvent, which may be a lower alcohol such as methanol or ethanol, a carbonate such as ethylene carbonate, a ketone such as acetone, or tetrahydrofuran, N-methylpyrrolidone or the like. A percentage of water in the mixed solvent is preferably equal to or more than 50 mass %, or more preferably equal to or more than 70 mass %.

When the electrode mixture layer composition is in a coatable slurry form, the content of the media including water as a percentage of the total composition is in a range of preferably 25 to 90 mass %, or more preferably 35 to 70 mass % from a standpoint of slurry coating properties, energy costs required for drying, and productivity. If the electrode mixture layer composition is in a wet powder form that can be pressed, the content of the media is preferably 3 to 40 mass % or more preferably 10 to 30 mass % from the standpoint of obtaining evenness in the mixture layer after pressing.

The binder of the present teachings may be formed solely of the crosslinked polymer or salt thereof, but this may also be combined with another binder component such as styrene/butadiene latex (SBR), acrylic latex, and polyvinylidene fluoride latex. When another binder component is included, the amount thereof is preferably 0.1 to 5 mass % at most, or more preferably 0.1 to 2 mass % at most, or still more preferably 0.1 to 1 mass % at most of the active material. If the amount of the other binder component exceeds 5 mass %, resistance increases, and the high-rate characteristics may become insufficient.

Of the above, styrene/budadiene latex is preferable from the standpoint of balancing of binding ability and flex resistance.

This styrene/butadiene latex is an aqueous dispersion of a copolymer having a structural unit derived from an aromatic vinyl monomer such as styrene and a structural unit derived from an aliphatic conjugated diene monomer such as 1,3-butadiene.

Examples of the aromatic vinyl monomer include α-methylstyrene, vinyltoluene and divinylbenzene as well as styrene, and one of these or two or more may be used.

The structural unit derived from the aromatic vinyl monomer in the copolymer described above constitutes preferably 20 to 60 mass %, or more preferably 30 to 50 mass % of the copolymer from the standpoint of binding ability primarily.

Examples of the aliphatic conjugated diene monomer include 2-methyl-1,3-butadiene, 2,3-dimethyl-1,3-butadiene and 2-chloro-1,3-butadiene as well as 1,3-butadiene, and one of these or two or more may be used.

The structural unit derived from the aliphatic conjugated diene monomer constitutes preferably 30 to 70 mass %, or more preferably 40 to 60 mass % of the copolymer from a standpoint of binding ability of the binder and flexibility of the resulting electrode.

To further improve binding performance and the like, the styrene/butadiene latex may also use a nitrile group-containing monomer such as (meth)acrylonitrile or a carboxyl group-containing monomer such as (meth)acrylic acid, itaconic acid or maleic acid as a copolymerized monomer in addition to the monomers described above.

The structural unit derived from the other monomer is contained in the copolymer in the amount of preferably 0 to 30 mass %, or more preferably 0 to 20 mass %.

The electrode mixture layer composition for a nonaqueous electrolyte secondary battery of the present teachings has the active material, water and a binder as essential components, and is obtained by mixing each component by known methods. The methods of mixing the individual components are not particularly limited, and known methods may be used, but in a preferred method the powder components including the active material, conductive aid and binder (crosslinked polymer particle) are dry blended, and then mixed with a dispersion medium such as water and dispersed and kneaded.

When the electrode mixture layer composition is obtained in slurry form, it is preferably refined into a slurry without dispersion defects or aggregation. The mixing method may be one using a known mixer such as a planetary mixer, thin film swirling mixer or self-revolving mixer, and a thin film swirling mixer is preferable for obtaining a good dispersed state in a short time. When a thin film swirling mixer is used, pre-dispersion is preferably performed in advance with a disperser or other stirring device.

The viscosity of the slurry is in the range of preferably 500 to 100,000 mPa·s, or more preferably 1,000 to 50,000 mPa·s (B type viscosity at 60 rpm).

When the electrode mixture layer composition is obtained as a wet powder, it is preferably kneaded with a Henschel mixer, blender, planetary mixer or twin-screw kneader or the like to obtain a uniform state without concentration irregularities.

(Non-Aqueous Electrolyte Secondary Battery Electrode)

The non-aqueous electrolyte secondary battery electrode of the present teachings is provided with a mixture layer formed from the electrode mixture layer composition on the surface of a collector such as a copper or aluminum collector. The mixture layer is formed by first coating the electrode mixture layer composition of the present teachings on the surface of the collector, and then drying to remove water or other medium. The method of coating the mixture layer composition is not particularly limited, and a known method such as a doctor blade method, dipping, roll coating, comma coating, curtain coating, gravure coating or extrusion may be adopted. The drying may also be accomplished by a known method such as warm air blowing, pressure reduction, (far) infrared exposure or microwave exposure.

The mixture layer obtained after drying is normally subjected to compression treatment with a metal press, roll press or the like. By compressing, the active material and the binder are brought into close contact with each other, and the strength of the mixture layer and the adhesion to the collector can be improved. Preferably compression reduces a thickness of the mixture layer to about 30% to 80% of its pre-compression thickness, and the thickness of the mixture layer after compression is normally about 4 to 200 μm.

A nonaqueous electrolyte secondary battery can be prepared by providing a separator and a nonaqueous electrolyte solution with the nonaqueous electrolyte secondary battery electrode of the present teachings.

The separator is disposed between the positive and negative electrodes of the battery, and serves to prevent short-circuits due to contact between the electrodes, hold the electrolyte solution and ensure ion conductivity. The separator is preferably an insulating finely porous film, having good ion permeability and mechanical strength. Specific materials that can be used include polyolefins such as polyethylene and polypropylene, and polytetrafluoroethylene and the like.

For the nonaqueous electrolyte solution, a known electrolyte solution commonly used in nonaqueous electrolyte secondary batteries can be used. Specific examples of the solvent include cyclic carbonates with high dielectric constants and good ability to dissolve electrolytes, such as propylene carbonate and ethylene carbonate, and linear carbonates with low viscosity, such as ethyl methyl carbonate, dimethyl carbonate and diethyl carbonate, and these may be used alone or as a mixed solvent. A lithium salt such as $LiPF_6$, $LiSbF_6$, $LiBF_4$, $LiClO_4$ or $LiAlO_4$ is dissolved in these solvents and used as the nonaqueous electrolyte solution.

The nonaqueous electrolyte secondary battery can be obtained by winding or laminating the positive plate and negative plate with the separator between the two, and enclosing this in a case or the like.

EXAMPLES

The present teachings will be described in detail below based on examples. However, the present teachings are not limited to these examples. In the following, "parts" and "%" mean parts by mass and % by mass respectively, unless otherwise specified.

Manufacturing Example 1: Manufacture of Crosslinked Polymer R-1

A reactor equipped with a stirring blade, a thermometer, a reflux condenser and a nitrogen inlet pipe was used for polymerization.

880 parts of acetonitrile, 100 parts of acrylic acid (hereunder referred to as "AA") and 0.5 parts of pentaerythritol triallyl ether (product name "NeoallylP-30" by Daiso Co., Ltd.) were charged into the reactor.

The inside of the reactor was thoroughly purged with nitrogen, and heated to raise the internal temperature to 55° C. Once the internal temperature was confirmed to have stabilized at 55° C., 0.125 parts of 2,2'-azobis(2,4-dimethylvaleronitrile) (product name "V-65" by Wako Pure Chemical Industries, Ltd.) were added as a polymerization initiator, and since white turbidity was observed in the reaction solution at this point, this was taken as the polymerization initiation point. The polymerization reaction was continued with the external temperature (water bath temperature) being adjusted to maintain an internal temperature of 55° C., cooling of the reaction solution was initiated when 6 hours had elapsed since the polymerization initiation point, and the internal temperature was cooled to 30° C. or less to obtain a slurry-like polymerization reaction solution comprising particles of the crosslinked polymer R-1 (unneutralized) dispersed in a medium.

The resulting polymer reaction solution was centrifuged to precipitate the polymer particles, and the supernatant was removed. The precipitate was then re-dispersed in acetonitrile having the same weight as the polymer reaction solution, and the operations of precipitating the polymer particles by centrifugation and removing the supernatant were repeated twice. The precipitate was collected and dried for 3 hours at 80° C. under reduced pressure to remove the volatile components and obtain a powder of the crosslinked polymer R-1. Because the crosslinked polymer R-1 is hygroscopic, it was sealed and stored in a container having water vapor barrier properties.

(Measuring Average Particle Diameter of 1 Mass % NaCl Aqueous Solution of (Li-Neutralized) Crosslinked Polymer R-1)

0.25 g of the crosslinked polymer R-1 powder obtained above and 49.75 g of lithium hydroxide aqueous solution (containing lithium hydroxide equivalent to 90 mol % of the carboxyl groups in the crosslinked polymer R-1) were measured into a 100 cc container, and set in a rotating/revolving mixer ("Awatori Rentaro AR-250" by Thinky Corporation). This was then stirred (rotating speed 2,000 rpm/revolving speed 800 rpm, 7 minutes), and then defoamed (rotating speed 2,200 rpm/revolving speed 60 rpm, 1 minute) to prepare a hydrogel of a lithium salt of the crosslinked polymer R-1 (degree of neutralization 90%) swelled with water.

Next, the particle size distribution of this hydrogel was measured with a laser diffraction/scattering type particle size distribution analyzer (Nikkiso Co., Ltd., Microtrac MT-3300EX2) using a 1 mass % NaCl aqueous solution as a dispersion medium. With the dispersion medium circulating in an excess amount relative to the hydrogel, when the hydrogel in an amount sufficient to obtain a suitable scattered light intensity was added and the dispersion medium was added, the measured particle size distribution shape stabilized after a few minutes. Once stability was confirmed, volume-based particle size distribution measurement was performed, and the average particle diameter was found to be 1.9 μm (median diameter (D50)).

A 90 mol % neutralized product of the crosslinked polymer R-1 swells thoroughly in ion-exchange water to form a hydrogel, but in a 1 mass % NaCl aqueous solution the degree of swelling is reduced because the electrostatic repulsion between carboxy anions is blocked, and particle size distribution measurement is possible because dispersion stability in the dispersion medium is maintained by the effect of the carboxylate salt. The smaller the median diameter as measured in a 1 mass % NaCl aqueous solution medium, the more the crosslinked polymer salt is regarded as forming a hydrogel as an aggregation of smaller (more numerous) gel particles even in ion-exchange water. In other means, this means it is broken up into smaller particles in water.

(Measuring Average Particle Diameter of 1 Mass % NaCl Aqueous Solution of (Na-Neutralized) Crosslinked Polymer R-1)

0.25 g of the crosslinked polymer R-1 powder obtained above and 49.75 g of sodium hydroxide aqueous solution (containing sodium hydroxide equivalent to 90 mol % of the carboxyl groups in the crosslinked polymer R-1) were measured into a 100 cc container, and set in a rotating/revolving mixer (Thinky Corporation, Awatori Rentaro AR-250). This was then stirred (rotating speed 2,000 rpm/revolving speed 800 rpm, 7 minutes), and then defoamed (rotating speed 2,200 rpm/revolving speed 60 rpm, 1 minute) to prepare a hydrogel of a sodium salt of the crosslinked polymer R-1 (degree of neutralization 90%) swelled with water.

Next, the particle size distribution of the hydrogel was measured with a laser diffraction/scattering type particle size distribution analyzer (Nikkiso Co., Ltd., Microtrac MT-3300EX2) using a 1 mass % NaCl aqueous solution as the dispersion medium. With the dispersion medium circulating in an excess amount relative to the hydrogel, when the hydrogel in an amount sufficient to obtain a suitable scattered light intensity was added and the dispersion medium was added, the measured particle size distribution shape stabilized after a few minutes. Once stability was confirmed, volume-based particle size distribution measurement was performed, and the average particle diameter was found to be 2.1 pun (median diameter (D50)).

Manufacturing Examples 2, 3 and 5: Manufacture of Crosslinked Polymers R-2, R-3 and R-5

The same operations were performed as in Manufacturing Example 1 except that the charged amounts of each starting material were as shown in Table 1, to obtain crosslinked polymers R-2, R-3 and R-5 in powder form. Each crosslinked polymer was sealed and stored in a container having water vapor barrier properties.

Li-neutralized products were prepared from each of the resulting polymers as in Manufacturing Example 1, and the average particle diameters of each were measured in a 1 mass % NaCl aqueous solution. The results are shown in Table 1.

Manufacturing Example 4: Manufacture of Crosslinked Polymer R-4

The same operations were performed as in Manufacturing Example 1 except that the charged amounts of each starting material were as shown in Table 1, to obtain a crosslinked polymer R-4 in powder form. The crosslinked polymer R-4 was sealed and stored in a container having water vapor barrier properties.

Li-neutralized products were prepared as in Manufacturing Example 1 from the resulting crosslinked polymer. Three kinds of the lithium hydroxide aqueous solution for neutralization were prepared, containing lithium hydroxide in amounts corresponding to 85 mol %, 90 mol % and 95 mol % of the carboxyl groups in the crosslinked polymer R-4, Li-neutralized salts of the crosslinked polymer R-4 with different degrees of neutralization were prepared, and the average particle diameters were each measured in a 1 mass % NaCl aqueous solution. The results are shown in Table 1.

(Measuring Viscosity of 1 Mass % Aqueous Solution)

1.0 part of a powder of crosslinked polymer R-4 and 99 parts of lithium hydroxide aqueous solution were weighed into a container, and set in a rotating/revolving mixer (Thinky Corporation, Awatori Rentaro AR-250). The operations of stirring (rotating speed 2,000 rpm/revolving speed 800 rpm, 7 minutes) and defoaming (rotating speed 2,200 rpm/revolving speed 60 rpm, 1 minute) were then repeated until the unswelled powder part had disappeared, to prepare a hydrogel fine particle dispersion of a lithium salt of the crosslinked polymer R-4 swelled with water. Three kinds of the lithium hydroxide aqueous solution for neutralization were prepared, containing lithium hydroxide in amounts corresponding to 85 mol %, 90 mol % and 95 mol % of the carboxyl groups in the crosslinked polymer R-4, and hydrogel dispersions with differing degrees of neutralization were prepared. Each of the resulting hydrogel fine particle dispersions was adjusted to a temperature of 25° C.±1° C., and viscosity was measured at a rotor speed of 12 rpm using a B type viscometer (Toki Sangyo Co, Ltd., TVB-10). The results are shown in Table 1.

(Measuring Viscosity of 3 Mass % Aqueous Solution)

Using the same operations used to measure the viscosity of the 1 mass % aqueous solution except that 3.0 parts of a powder of the crosslinked polymer R-4 and 97 parts of lithium hydroxide aqueous solution were weighed into a container, and hydrogel fine particle dispersions were prepared corresponding to degrees of neutralization of 85 mol %, 90 mol % and 95 mol %. Each of the resulting hydrogel fine particle dispersions was adjusted to 25° C.±1° C., and viscosity was measured at a rotor speed of 12 rpm using a B type viscometer (Toki Sangyo Co., Ltd., TVB-10). The results are shown in Table 1.

Manufacturing Example 19: Manufacture of Crosslinked Polymer R-19

A powder of the crosslinked polymer R-19 was obtained by the same operations as in Manufacturing Example 1 except that the charged amounts of the starting materials were as shown in Table 3. The crosslinked polymer R-19 was sealed and stored in a container having water vapor barrier properties.

A Li-neutralized product was prepared as in Manufacturing Example 1 from each of the resulting polymers, and the average particle diameter was measured in a 1 mass % NaCl aqueous solution. The results are shown in Table 3.

(Measuring Aqueous Solution Viscosity)

Using the crosslinked polymer R-19 instead of the crosslinked polymer R-4, the viscosity of a 1 mass % aqueous solution and the viscosity of a 3 mass % aqueous solution were measured by the same operations as in Manufacturing Example 4 except using a lithium hydroxide aqueous solution containing lithium hydroxide equivalent to 90 mol % of the carboxyl groups in the crosslinked polymer R-19. The results are shown in Table 3.

Manufacturing Example 6: Manufacture of Crosslinked Polymer Salt R-6

A reactor equipped with a stirring blade, a thermometer, a reflux condenser and a nitrogen inlet pipe was used for polymerization.

875.6 parts of acetonitrile, 4.40 parts of ion-exchange water and 100 parts of AA were charged into a reactor. The inside of the reactor was thoroughly purged with nitrogen, and heated so that the internal temperature was raised up to 55° C. Once the internal temperature was confirmed to have stabilized at 55° C., 0.0625 parts of the polymerization initiator V-65 were added, and since white turbidity was observed in the reaction solution at this point, this was taken as the polymerization initiation point.

The polymerization reaction was continued with the external temperature (water bath temperature) being adjusted to maintain an internal temperature of 55° C., cooling of the reaction solution was initiated when 6 hours had elapsed since the polymerization initiation point, and the internal temperature was reduced to 25° C., after which 52.5 parts of a powder of lithium hydroxide monohydrate (hereunder referred to as $LiOH.H_2O$) were added. After addition, stirring was continued for 12 hours at room temperature, to obtain a slurry-like polymerization reaction solution comprising particles of the crosslinked polymer salt R-6 (Li salt, degree of neutralization 90 mol %) dispersed in a medium.

The resulting polymer reaction solution was centrifuged to precipitate the polymer particles, and the supernatant was removed. The precipitate was then re-dispersed in acetonitrile having the same weight as the polymerization reaction solution, and the operations of precipitating the polymer particles by centrifugation and removing the supernatant were repeated twice. The precipitate was collected and dried for 3 hours at 80° C. under reduced pressure to remove the volatile components and obtain a powder of the crosslinked polymer salt R-6. Because the crosslinked polymer salt R-6 is hygroscopic, it was sealed and stored in a container having water vapor barrier properties. When the powder of the crosslinked polymer salt R-6 was measured by IR and the degree of neutralization was determined from intensity ratio of the peak derived from the C=O group of the carboxylic acid and the peak derived from the C=O of the lithium carboxylate, it was equal to the calculated value from charging, which was 90 mol %.

(Measuring Average Particle Diameter of 1 Mass % NaCl Aqueous Solution of (Li-Neutralized) Crosslinked Polymer Salt R-6)

0.25 g of the powder of the crosslinked polymer salt R-6 obtained above and 49.75 g of ion-exchange water were measured into a 100 cc container, and set in a rotating/revolving mixer (Thinky Corporation, Awatori Rentaro AR-250). This was then stirred (rotating speed 2,000 rpm/revolving speed 800 rpm, 7 minutes), and then defoamed (rotating speed 2,200 rpm/revolving speed 60 rpm, 1 minute) to prepare a hydrogel of the crosslinked polymer salt R-6 swelled with water.

Next, the particle size distribution of this hydrogel was measured with a laser diffraction/scattering type particle size distribution analyzer (Nikkiso Co., Ltd., Microtrac MT-3300EX2) using a 1 mass % NaCl aqueous solution as adispersion medium. With the dispersion medium circulating in an excess amount relative to the hydrogel, when the hydrogel in an amount sufficient to obtain a suitable scattered light intensity was added and the dispersion medium was added, the measured particle size distribution shape stabilized after a few minutes. Once stability was confirmed, volume-based particle size distribution measurement was performed, and the average particle diameter was found to be 1.6 m (median diameter (D50)).

Manufacturing Examples 7 to 18

Manufacture of crosslinked polymer salts R-7 to R-18 The same operations were performed as in Manufacturing Example 6 except that the charged amounts of each starting material were as shown in Table 2 or Table 3, to obtain crosslinked polymer salts R-7 to R-18 in powder form. Each crosslinked polymer salt was sealed and stored in a container having water vapor barrier properties. In a case of the Manufacturing Example 8, two levels of the crosslinked polymer salt R-8 with degrees of neutralization of 80 mol % and 90 mol % were obtained by varying the added amount of the $LiOH.H_2O$ in the process neutralization.

As in Manufacturing Example 6, the average particle diameters of the resulting polymer salts were measured in 1 mass % NaCl aqueous solutions. The results are shown in Table 2 and Table 3.

(Measuring Aqueous Solution Viscosity)

Using the crosslinked polymer salts R-8 to R-11 instead of the crosslinked polymer R-4, the viscosity of 1 mass % aqueous solutions and the viscosity of 3 mass % aqueous solutions were measured by the same operations as in Manufacturing Example 4 except using ion-exchange water instead of a lithium hydroxide aqueous solution. The results are shown in Table 2.

Manufacturing Example 20: Manufacture of Crosslinked Polymer Salt R-20

A reactor equipped with a stirring blade, a thermometer, a reflux condenser and a nitrogen inlet pipe was used for polymerization.

300 parts of methanol, 100 parts of AA, 0.2 parts of allyl methacrylate (hereunder referred to as "AMA", Mitsubishi Gas Chemical Company, Inc.) and 0.5 parts of Neoallyl™ P-30 were charged into a reactor. 32 parts of a $LiOH.H_2O$ powder for initial neutralization and 1.40 parts of ion-exchange water were then slowly added so that the internal temperature was maintained at 40° C. or less under stirring. The inside of the reactor was thoroughly purged with nitrogen, and heated so that the internal temperature was raised up to 68° C. Once the internal temperature was confirmed to have stabilized at 68° C., 0.02 parts of 4,4'-azobiscyanovaleric acid (product name "ACVA" by Otsuka Chemical Co., Ltd.) were added as a polymerization initiator, and since white turbidity was observed in the reaction solution at this point, this was taken as the polymerization initiation point. The polymerization reaction was continued with the external temperature (water bath temperature) being adjusted so as to gently reflux the solvent, and solvent reflux was maintained while 0.02 parts of ACVA were added 3 hours after the polymerization initiation point and an additional 0.035 parts of ACVA were added 6 hours after the polymerization initiation point. Cooling of the reaction solution was initiated 9 hours after the polymerization initiation point, the internal temperature was lowered to 30° C., and 20.5 parts of $LiOH.H_2O$ powder were then added slowly so that the internal temperature did not exceed 50° C. After addition of the $LiOH.H_2O$ powder, stirring was continued for 3 hours to obtain a slurry-like polymer reaction solution comprising particles of the crosslinked polymer salt R-20 (Li salt, degree of neutralization 90 mol %) dispersed in a medium.

The resulting polymer reaction solution was centrifuged to precipitate the polymer particles, and the supernatant was removed. The precipitate was then re-dispersed in acetonitrile having the same weight as the polymer reaction solution, and the operations of precipitating the polymer particles by centrifugation and removing the supernatant were repeated twice. The precipitate was collected and dried for 3 hours at 80° C. under reduced pressure to remove the volatile components and obtain a powder of the crosslinked polymer salt R-20. Because the crosslinked polymer salt R-20 is hygroscopic, it was sealed and stored in a container with water vapor barrier properties. When the powder of the crosslinked polymer salt R-20 was measured by IR and the degree of neutralization was determined from the intensity ratio of the peak derived from the C=O group of the carboxylic acid and the peak derived from the C=O of the lithium carboxylate, it was equal to the calculated value from charging, which was 90 mol %.

As in Manufacturing Example 6, the average particle diameter of the resulting polymer salt was measured in a 1 mass % NaCl aqueous solution. The results are shown in Table 3.

(Measuring Aqueous Solution Viscosity)

Using the crosslinked polymer salt R-20 instead of the crosslinked polymer R-4, the viscosity of a 1 mass % aqueous solution and the viscosity of a 3 mass % aqueous solution were measured by the same operations as in Manufacturing Example 4 except using ion-exchange water instead of a lithium hydroxide aqueous solution. The results are shown in Table 3.

Manufacturing Example 21: Manufacture of Crosslinked Polymer Salt R-21

A powder of the crosslinked polymer salt R-21 was obtained by the same operations as in Manufacturing Example 20 except that the charged amounts of each starting material were as described in Table 3. The crosslinked polymer salt R-21 was sealed and stored in a container having water vapor barrier properties. As in Manufacturing Example 6, the average particle diameter of the resulting polymer salt was measured in a 1 mass % NaCl aqueous solution. The results are shown in Table 3.
(Measuring Aqueous Solution Viscosity)
Using the crosslinked polymer salt R-21 instead of the crosslinked polymer R-4, the viscosity of a 1 mass/o aqueous solution and the viscosity of a 3 mass % aqueous solution were measured by the same operations as in Manufacturing Example 4 except using ion-exchange water instead of a lithium hydroxide aqueous solution. The results are shown in Table 3.

TABLE 1

|  |  |  | Manufacturing Example No. | | | | | | |
|---|---|---|---|---|---|---|---|---|---|
|  |  |  | ME 1 | ME 2 | ME 3 | ME 4 | | ME 5 | |
| Charged (parts) | Crosslinked polymer |  | R-1 | R-2 | R-3 | R-4 | | R-5 | |
|  | Monomer | AA | 100 | 100 | 100 | 100 | | 100 | |
|  |  | MAA |  |  |  |  |  |  |  |
|  |  | 2-MEA |  |  |  |  |  |  |  |
|  |  | BA |  |  |  |  |  |  |  |
|  |  | DMAA |  |  |  |  |  |  |  |
|  | Crosslinkable monomer | AMA |  |  | 0.2 |  |  |  |  |
|  |  | P-30 | 0.5 | 0.5 | 0.5 | 0.5 | | 1.0 | |
|  | Initial neutralization | LiOH•H₂O |  |  |  |  |  |  |  |
|  | Polymerization solvent | Water |  |  |  |  |  |  |  |
|  |  | AcN | 880 | 440 | 880 | 880 | | 880 | |
|  |  | EAc |  | 440 |  |  |  |  |  |
|  |  | Tol |  |  |  |  |  |  |  |
|  |  | MeOH |  |  |  |  |  |  |  |
|  | Polymerization initiator | V-65 | 0.125 | 0.125 | 0.125 | 0.0625 | | 0.625 | |
|  |  | ACVA (initial) |  |  |  |  |  |  |  |
|  |  | ACVA (addtional) |  |  |  |  |  |  |  |
|  | Process neutralization | LiOH•H₂O |  |  |  |  |  |  |  |
|  |  | NaOH |  |  |  |  |  |  |  |
| Initial monomer concentration (mass %) | | | 10.2% | 10.2% | 10.2% | 10.2% | | 10.2% | |
| Crosslinking agent as mol % of monomers | | | 0.14% | 0.14% | 0.25% | 0.14% | | 0.28% | |
| Neutralizing salt type | | | — | — | — | — | | — | |
| Degree of neutralization: initial neutralization + process neutralization | | | 0.0% | 0.0% | 0.0% | 0.0% | | 0.0% | |
| Physical characteristcics evaluation | Degree of neutralization | | 90.0% | 90.0% | 90.0% | 85.0% | 90.0% | 95.0% | 90.0% |
|  | Neutralizing salt type | | Li | Na | Li | Li | Li | Li | Li |
|  | Average particle diameter (μm) in 1 mass % NaCl aqueous solution | | 1.9 | 2.1 | 5.8 | 2 | 1.8 | 1.8 | 2.3 |
|  | Viscosity (mPas) in 1 mass % aqueous solution | | | | | 44,000 | 40,000 | 37,000 | |
|  | Viscosity (mPas) in 3 mass % aqueous solution | | | | | >50,000 | >50,000 | >50,000 | |

TABLE 2

|  |  |  | Manufacturing Example No. | | | | | | | |
|---|---|---|---|---|---|---|---|---|---|---|
|  |  |  | ME 6 | ME 7 | ME 8 | ME 9 | ME 10 | ME 11 | ME 12 | ME 13 |
| Charged (parts) | Crosslinked polymer | | R-6 | R-7 | R-8 | R-9 | R-10 | R-11 | R-12 | R-13 |
|  | Monomer | AA | 160 | 100 | 100 | 100 | 100 | 100 | 100 | 100 |
|  |  | MAA |  |  |  |  |  |  |  |  |
|  |  | 2-MEA |  |  |  |  |  |  |  |  |
|  |  | BA |  |  |  |  |  |  |  |  |
|  |  | DMAA |  |  |  |  |  |  |  |  |
|  | Crosslinkable monomer | AMA |  |  |  |  |  |  |  |  |
|  |  | P-30 |  | 0.2 | 0.5 | 1.0 | 1.3 | 2.0 | 0.5 | 0.5 |
|  | Initial neutralization | LiOH•H₂O |  |  |  |  |  |  |  | 4.5 |
|  | Polymerization solvent | Water | 4.40 | 4.40 | 4.40 | 4.40 | 4.40 | 4.40 | 4.40 | 14.0 |
|  |  | AcN | 875.6 | 875.6 | 875.6 | 875.6 | 875.6 | 875.6 | 875.6 | 866 |
|  |  | EAc |  |  |  |  |  |  |  |  |
|  |  | Tol |  |  |  |  |  |  |  |  |
|  |  | MeOH |  |  |  |  |  |  |  |  |
|  | Polymerization initiator | V-65 | 0.0625 | 0.0625 | 0.0625 | 0.0625 | 0.0625 | 0.0625 | 0.0625 | 0.0625 |
|  |  | ACVA (initial) |  |  |  |  |  |  |  |  |
|  |  | ACVA (additional) |  |  |  |  |  |  |  |  |
|  | Process neutralization | LiOH•H₂O | 52.5 | 52.5 | 46.7 | 52.5 | 52.5 | 52.5 | 52.5 | 48.0 |
|  |  | NaOH |  |  |  |  |  |  | 50.0 |  |

TABLE 2-continued

|  |  | Manufacturing Example No. | | | | | | | |
| --- | --- | --- | --- | --- | --- | --- | --- | --- | --- |
|  |  | ME 6 | ME 7 | ME 8 | ME 9 | ME 10 | ME 11 | ME 12 | ME 13 |
| Initial monomer concentration (mass %) | | 10.2% | 10.2% | 10.2% | 10.2% | 10.2% | 10.2% | 10.2% | 10.2% |
| Crosslinking agent as mol % of monomers | | 0.00% | 0.056% | 0.14% | 0.14% | 0.28% | 0.37% | 0.56% | 0.14% | 0.14% |
| Neutralizing salt type | | Li | Li | Li | Li | Li | Li | Li | Na | Li |
| Degree of neutralization: Initial neutralization + process neutralization | | 90.0% | 90.0% | 90.0% | 90.0% | 90.0% | 90.0% | 90.0% | 90.0% | 90.0% |
| Physical characteristics evaluation | Degree of neutralization | 90.0% | 90.0% | 80.0% | 90.0% | 90.0% | 90.0% | 90.0% | 90.0% | 90.0% |
|  | Neutralizing salt type | Li | Li | Li | Li | Li | Li | Li | Na | Li |
|  | Average particle diameter (μm) in 1 mass % NaCl aqueous solution | 1.6 | 1.5 | 1.5 | 1.5 | 1.4 | 1.4 | 1.8 | 1.8 | 0.9 |
|  | Viscosity (mPas) in mass % aqueous solution |  |  | 88 | 55 | <15 | <15 | <15 |  |  |
|  | Viscosity (mPas) in 3 mass % aqueous solution |  |  | >50,000 | >50,000 | 22,000 | 8,900 | 4,100 |  |  |

TABLE 3

|  |  |  | Manufacturing Example No. | | | | | | | |
| --- | --- | --- | --- | --- | --- | --- | --- | --- | --- | --- |
|  |  |  | ME 14 | ME 15 | ME 16 | ME 17 | ME 18 | ME 19 | ME 20 | ME 21 |
|  | Crosslinked polymer |  | R-14 | R-15 | R-16 | R-17 | R-18 | R-19 | R-20 | R-21 |
| Charged (parts) | Monomer | AA | 70 | 80 | 70 | 60 | 60 | 100 | 100 | 100 |
|  |  | MAA | 30 |  |  |  |  |  |  |  |
|  |  | 2-MEA |  |  | 30 | 40 |  |  |  |  |
|  |  | BA |  | 20 |  |  |  |  |  |  |
|  |  | DMAA |  |  |  |  | 40 |  |  |  |
|  | Crosslinkable monomer | AMA |  |  |  |  |  |  | 0.2 | 0.7 |
|  |  | P-30 | 0.5 | 0.5 | 0.5 | 0.5 | 0.5 | 0.8 | 0.5 | 2.0 |
|  | Initial neutralization | LiOH•H$_2$O |  |  |  |  |  |  | 32.00 | 32.0 |
|  | Polymerization solvent | Water | 4.40 | 4.40 | 4.40 | 4.40 | 4.40 |  | 1.40 | 1.40 |
|  |  | AcN | 875.6 | 875.6 | 875.6 | 875.6 | 875.6 |  |  |  |
|  |  | EAc |  |  |  |  |  |  |  |  |
|  |  | Tol |  |  |  |  |  | 880 |  |  |
|  |  | MEOH |  |  |  |  |  |  | 300 | 300 |
|  | Polymerization initiator | V-65 | 0.0625 | 0.0625 | 0.0625 | 0.0625 | 0.0625 | 0.0625 |  |  |
|  |  | ACVA (initial) |  |  |  |  |  |  | 0.020 | 0.020 |
|  |  | ACVA (additional) |  |  |  |  |  |  | 0.055 | 0.055 |
|  | Process neutralization | LiOH•H$_2$O | 49.9 | 42.0 | 36.8 | 31.5 | 31.5 |  | 20.5 | 20.5 |
|  |  | NaOH |  |  |  |  |  |  |  |  |
| Initial monomer concentration (mass %) | | | 10.2% | 10.2% | 10.2% | 10.2% | 10.2% | 10.2% | 23.0% | 22.9% |
| Crosslinking agent as mol % of monomers | | | 0.15% | 0.15% | 0.16% | 0.17% | 0.16% | 0.21% | 0.25% | 0.96% |
| Neutralizing salt type | | | Li | Li | Li | Li | Li | — | Li | Li |
| Degree of neutralization: Initial neutralization + process neutralization | | | 90.0% | 90.0% | 90.0% | 90.0% | 90.0% | 0.0% | 90.0% | 90.0% |
| Physical characteristics evaluation | Degree of neutralization | | 90.0% | 90.0% | 90.0% | 90.0% | 90.0% | 90.0% | 90.0% | 90.0% |
|  | Neutralizing salt type | | Li | Li | Li | Li | Li | Li | Li | Li |
|  | Average particle diameter (μm) in 1 mass % NaCl aqueous solution | | 3.8 | 1.3 | 1.4 | 1.2 | 2.2 | 22.0 | 18.0 | 85.0 |
|  | Viscosity (mPas) in 1 mass % aqueous solution | |  |  |  |  |  | >50,000 | >50,000 | >50,000 |
|  | Viscosity (mPas) in 3 mass % aqueous solution | |  |  |  |  |  | >50,000 | >50,000 | >50,000 |

The details of the compounds used in Tables 1 to 3 are given below.

AA: Acrylic acid

MAA: Methacrylic acid

2-MEA: 2-methoxyethyl acrylate

BA: Butyl acrylate

DMAA: N,N-dimethyl acrylamide

AMA: Allyl methacrylate

P-30: Pentaerythritol triallyl ether (Daiso Co., Ltd. Neoallyl™ P-30)

AcN: Acetonitrile

EAc: Ethyl acetate

Tol: Toluene

MeOH: Methanol

V-65: 2,2'-azobis(2,4-dimethylvaleronitrile) (Wako Pure Chemical Industries, Ltd.)

ACVA: 4,4'-azobiscyanovaleric acid (Otsuka Chemical Co., Ltd.)

(Electrode Evaluation: Negative Electrode)

Example 1

The coating properties of a mixture layer composition using graphite as the negative electrode active material and the crosslinked polymer R-1 as the binder were measured, and the peel strength between the formed mixture layer and the collector (that is, the binding ability of the binder) was evaluated.

100 parts of natural graphite (product name "CGB-10" by Nippon Graphite Industries) and 2.2 parts of the crosslinked polymer R-1 in powder form were weighed and thoroughly premixed, and a solution of 1.15 parts of LiOH.H$_2$O powder (equivalent to a degree of neutralization of 90 mol %) dissolved in 140 parts of ion-exchange water was added and pro-dispersed with a disperser, after which main dispersion was performed for 15 seconds at a peripheral speed of 20 m/second with a thin film swirling mixer (Primix Corporation, FM-56-30) to obtain a slurry-like negative electrode mixture layer composition.

This mixture layer composition was coated with an adjustable applicator on a 20 μm-thick copper foil (Nippon Foil Mfg. Co., Ltd.) so that the dried and pressed film thickness was 50 μm, and then immediately dried for 10 minutes at 100° C. in a ventilating dryer to form a mixture layer. The external appearance of the resulting mixture layer was observed with the naked eye, and the coating properties were evaluated according to the following standard and judged as good ("A").

(Coating Property Evaluation Standard)

A: No streaks, spots or other appearance defects observed on surface

B: Slight streaks, spots or other appearance defects observed on surface

C: Obvious streaks, spots or other appearance defects observed on surface (90° Peel Strength (Binding Ability))

The mixture layer density was adjusted with a roll press to 1.7±0.05 g/cm$^3$ to prepare an electrode, which was then cut into a 25 mm-wide strip to prepare a sample for peel testing. The mixture layer side of this sample was affixed to a horizontally fixed double-sided tape and peeled at 90° at a rate of 50 mm/minute, and the peel strength between the mixture layer and the copper foil was measured. The peel strength was high at 12.8 N/m, exhibiting a favorable strength.

In general, when an electrode is cut, worked and assembled into a battery cell, greater peel strength is necessary to prevent the problem of detachment of the mixture layer from the collector (copper foil). The high peel strength in this case means that the binder provides excellent binding ability between the active materials and between the active material and the electrode, and suggests that it is possible to obtain a battery with excellent durability and little loss of capacity during charge-discharge cycle testing.

(Flex Resistance)

This was evaluated using an electrode sample similar to that used in the 90° peel strength test. The electrode sample was wrapped around a stainless steel rod 2.0 mm in diameter, the condition of the bent mixture layer was observed, and flex resistance was evaluated based on the following standard, resulting in an evaluation of "A".

A: No appearance defects observed in mixture layer

B: Fine cracks observed in mixture layer

C: Obvious cracks observed in the mixture layer, or the mixture layer partially detached Examples 2 to 7 and Comparative Examples 1 and 2

Mixture layer compositions were prepared by the same operations as in Example 1 except that the crosslinked polymer used as the binder, the neutralizing agent and the ion-exchange water were as shown in Table 4, and the coating properties, 90° peel strength and flex resistance were evaluated. In preparing the mixture compositions, the compounded amount of the ion-exchange water was adjusted appropriately to obtain a viscosity suitable for coating. The results are shown in Table 4.

In Comparative Example 2, a commercial crosslinked polyacrylic acid powder (product name "Carbopol 980" by the Lubrizol Corporation) was used as the binder. The particle diameter of the Carbopol® 980 (90 mol % Li-neutralized salt) dispersed in a 1 mass % NaCl aqueous solution was 8.2 μm (volume-based median diameter). The amount of alkali used in lithium neutralization of the Carbopol® 980 was determined based on the theoretical acid value of polyacrylic acid.

TABLE 4

|  |  | Ex 1 | Ex 2 | Ex 3 | Ex 4 | Ex 5 | Ex 6 | Ex 7 | CE 1 | CE 2 |
|---|---|---|---|---|---|---|---|---|---|---|
| Graphite (CGB-10) |  | 100 | 100 | 100 | 100 | 100 | 100 | 100 | 100 | 100 |
| Crosslinked polymer | Type | R-1 | R-1 | R-2 | R-3 | R-4 | R-4 | R-5 | R-19 | Carbopol® 980 |
|  | Parts | 2.20 | 1.86 | 2.20 | 2.20 | 2.20 | 2.20 | 2.20 | 2.20 | 2.20 |
| Neutralizing agent | Type | LiOH•H$_2$O | 48% NaOH aq | LiOH•H$_2$O | LiOH•H$_2$O | LiOH•H$_2$O | LiOH•H$_2$O | LiOH•H$_2$O | LiOH•H$_2$O | LiOH•H$_2$O |
|  | Parts | 1.15 | 1.94 | 1.15 | 1.15 | 1.15 | 1.15 | 1.15 | 1.15 | 1.15 |
| Degree of neutralization |  | 90% | 90% | 90% | 90% | 90% | 90% | 90% | 90% | 90% |
| Ion-exchange water |  | 140 | 150 | 134 | 166 | 150 | 124 | 166 | 150 | 150 |
| Mixture layer slurry concentration |  | 42.1% | 40.3% | 43.1% | 38.0% | 40.4% | 45.0% | 38.0% | 40.4% | 40.4% |
| Coating properties |  | A | A | B | A | A | B | A | B | B |
| Peel strength N/m |  | 12.8 | 17.6 | 9.2 | 14.4 | 14.6 | 11.9 | 15.2 | 6.4 | 7.2 |
| Flex resistance |  | A | A | B | A | A | A | A | C | C |

Example 8

100 parts of natural graphite CGB-10 and 2.4 parts of the crosslinked polymer salt R-6 in powder form were weighed and thoroughly premixed, 125 parts of ion-exchange water were added, and the mixture was thoroughly pre-dispersed with a disperser, after which main dispersion was performed for 15 seconds under conditions of peripheral speed 20 m/second with a thin film swirling mixer (Primix Corporation, FM-56-30) to obtain a negative electrode mixture layer composition in slurry form.

The resulting mixture layer composition was evaluated as in Example 1 with the results shown in Table 5.

Examples 9 to 22 and Comparative Examples 3 to 5

Mixture layer compositions were prepared by the same operations as in Example 8 except that the crosslinked polymer was used as the binder, the styrene/butadiene latex (SBR), and the neutralizing agent and the type and amount of ion-exchange water were as shown in Tables 5 and 6, and thereafter the coating properties, 90° peel strength and flex resistance were evaluated. In preparing the mixture compositions, the compounded amount of the ion-exchange water was adjusted appropriately to obtain a viscosity suitable for coating. "TRD2001" (product name, JSR Corporation; solid content 48.5%, pH 7.8) was used as the SBR. The results are shown in Tables 5 and 6.

TABLE 5

|  |  | Ex 8 | Ex 9 | Ex 10 | Ex 11 | Ex 12 | Ex 13 | Ex 14 | Ex 15 | Ex 16 |
|---|---|---|---|---|---|---|---|---|---|---|
| Graphite (CGB-10) |  | 100 | 100 | 100 | 100 | 100 | 100 | 100 | 100 | 100 |
| Crosslinked polymer salt | Type | R-6 | R-7 | R-8 | R-8 | R-9 | R-10 | R-11 | R-12 | R-13 |
|  | Neutralizing salt | Li | Li | Li | Li | Li | Li | Li | Na | Li |
|  | Degree of neutralization | 90% | 90% | 90% | 80% | 90% | 90% | 90% | 90% | 90% |
|  | Parts | 2.40 | 2.40 | 2.40 | 2.40 | 2.40 | 2.40 | 2.40 | 2.40 | 2.40 |
| SBR | Parts solids |  |  |  |  |  |  |  |  |  |
| Ion-exchange water |  | 125 | 125 | 125 | 125 | 110 | 105 | 105 | 125 | 125 |
| Mixture layer slurry concentration |  | 45.0% | 45.0% | 45.0% | 45.0% | 48.2% | 49.4% | 49.4% | 45.0% | 45.0% |
| Coating properties |  | A | A | A | A | A | A | A | A | A |
| Peel strength N/m |  | 9.6 | 14.4 | 16.0 | 16.8 | 15.6 | 15.2 | 12.2 | 19.2 | 13.2 |
| Flex resistance |  | B | A | A | A | A | A | A | A | A |

TABLE 6

|  |  | Ex 17 | Ex 18 | Ex 19 | Ex 20 | Ex 21 | Ex 22 | CE 3 | CE 4 | CE 5 |
|---|---|---|---|---|---|---|---|---|---|---|
| Graphite (CGB-10) | | 100 | 100 | 100 | 100 | 100 | 100 | 100 | 100 | 100 |
| Crosslinked polymer salt | Type | R-14 | R-15 | R-16 | R-17 | R-18 | R-8 | R-20 | R-21 | R-21 |
|  | Neutralizing salt | Li | Li | Li | Li | Li | Li | Li | Li | Li |
|  | Degree of neutralization | 90% | 90% | 90% | 90% | 90% | 90% | 90% | 90% | 90% |
|  | Parts | 2.40 | 2.40 | 2.40 | 2.40 | 2.40 | 1.40 | 2.40 | 2.40 | 1.40 |
| SBR | Parts | | | | | | 2.06 | | | 2.06 |
|  | solids | | | | | | 1.00 | | | 1.00 |
| Ion-exchange water | | 115 | 125 | 125 | 115 | 115 | 114 | 125 | 135 | 114 |
| Mixture layer slurry concentration | | 47.1% | 45.0% | 45.0% | 47.1% | 47.1% | 47.0% | 45.0% | 43.1% | 47.0% |
| Coating properties | | A | A | A | B | B | A | B | C | B |
| Peel strength N/m | | 10.4 | 12.0 | 12.8 | 9.9 | 14.9 | 12.8 | 1.6 | 4.6 | 2.9 |
| Flex resistance | | B | A | A | A | A | A | C | C | C |

Example 23

The coating properties of a mixture layer composition using silicon particles and graphite as the negative electrode active materials and the crosslinked polymer salt R-8 as the binder were measured, and the peel strength between the formed mixture layer and the collector (that is, the binding ability of the binder) was evaluated.

30 parts of silicon particles (Sigma-Aldrich Corporation, Si Nanopowder, particle diameter<100 nm) and 70 parts of natural graphite (product name "CGB-10" by Nippon Graphite Industries) were stirred for 1 hour at 300 rpm with a planetary ball mill (Fritsch GmbH, P-5). 1.8 parts of the crosslinked polymer salt R-8 (90 mol % Li-neutralized salt) in powder form were weighed into the resulting mixture and thoroughly premixed, 110 parts of ion-exchange water were added, and the mixture was pre-dispersed with a disperser, after which main dispersion was performed for 15 seconds at a peripheral speed of 20 m/second with a thin film swirling mixer (Primix Corporation, FM-56-30) to obtain a slurry-like negative electrode mixture layer composition.

The resulting mixture layer composition was evaluated as in Example 1 with the results shown in Table 7.

Example 24, Comparative Examples 6 and 7

Mixture layer compositions were prepared by the same operations as in Example 19 except that the active material and the type of crosslinked polymer used as the binder were as shown in Table 7, and the coating properties, 90° peel strength and flex resistance were evaluated. However, the mixture layer density of the electrode sample used in evaluating 90° peel strength and flex resistance was adjusted to 1.85±0.05 g/cm$^3$. The results are shown in Table 7.

TABLE 7

|  |  | Ex 23 | Ex 24 | CE 6 | CE 7 |
|---|---|---|---|---|---|
| Active material | Graphite | 70 | 85 | 70 | 85 |
|  | Silicon particles | 30 | 15 | 30 | 15 |
| Crosslinked polymer salt | Type | R-8 | R-8 | R-21 | R-21 |
|  | Neutralizing salt | Li | Li | Li | LI |
|  | Degree of neutralization | 90% | 90% | 90% | 90% |
|  | Parts | 1.80 | 1.80 | 1.80 | 1.80 |
| Ion-exchange water | | 110 | 110 | 110 | 110 |
| Mixture layer slurry concentration | | 48.1% | 48.1% | 48.1% | 48.1% |
| Coating properties | | A | A | B | B |
| Peel strength N/m | | 20.4 | 14.0 | 4.4 | 3.2 |
| Flex resistance | | A | A | C | C |

Electrode Evaluation: Positive Electrode

Example 25

The coating properties of a mixture layer composition using lithium nickel cobalt manganese oxide (NCM) as the positive electrode active material, acetylene black (AB) as the conductive aid and the crosslinked polymer R-1 as the binder were measured, and the peel strength between the formed mixture layer and the collector (that is, the binding ability of the binder) was evaluated.

95 parts of NCM111 (Toda Kogyo Corp., NM-3050), 5 parts of AB (Denki Kagaku HS-100) and 1.5 parts of the crosslinked polymer R-1 in powder formed were weighed and thoroughly premixed, 110 parts of ion-exchange water were added, and the mixture was pro-dispersed with a disperser, after which main dispersion was performed for 15 seconds at a peripheral speed of 20 m/second with a thin film swirling mixer (Primix Corporation, FM-56-30) to obtain a slurry-like positive electrode mixture layer composition. Because lithium ions are eluted (alkalized, exchanged for protons in water) from the NCM in the positive electrode mixture layer composition, some (or all) of the carboxyl groups of the crosslinked polymer R-1 are neutralized and converted to lithium salts. This positive electrode mixture layer composition has a pH of 8.7.

This mixture layer composition was coated with an adjustable applicator on a 15 μm-thick aluminum foil (Nippon Foil Mfg. Co., Ltd.) so that the dried and pressed film thickness was 50 μm, and then immediately dried for 10 minutes at 100° C. in a ventilating dryer to form a mixture layer. The external appearance of the resulting mixture layer was observed with the naked eye, and the coating properties were evaluated according to the following standard and judged as good ("A").

(Coating Property Evaluation Standard)

A: No streaks, spots or other appearance defects observed on surface

B: Slight streaks, spots or other appearance defects observed on surface

C: Obvious streaks, spots or other appearance defects observed on surface (90° Peel Strength (Binding Ability))

The mixture layer density was adjusted with a roll press to 2.7 f 0.1 g/cm$^3$ to prepare an electrode, which was then cut into a 25 mm-wide strip to prepare a sample for peel testing. The mixture layer side of this sample was affixed to a horizontally fixed double-sided tapes and peeled at 90° at a rate of 50 mm/minute, and the peel strength between the mixture layer and the copper foil was measured. The peel strength was high at 8.2 N/m, exhibiting a favorable strength.

(Flex Resistance)

Flex resistance was evaluated using an electrode sample similar to that used in the 90° peel strength test. The electrode sample was wrapped around a SUS rod 2.0 mm in diameter, the condition of the bent mixture layer was observed, and flex resistance was evaluated based on the following standard, resulting in an evaluation of "B".

A: No appearance defects observed in mixture layer
B: Fine cracks observed in mixture layer
C: Obvious cracks observed in mixture layer, or mixture layer partially detached Examples 26 to 29, Comparative Examples 8 and 9

Mixture layer compositions were prepared by the same operations as in Example 25 except that the crosslinked polymer salt used as the binder was as shown in Table 8, and thereafter the coating properties, 90° peel strength and flex resistance were evaluated. The results are shown in Table 8.

TABLE 8

|  | Ex 25 | Ex 26 | Ex 27 | Ex 28 | Ex 29 | CE 8 | CE 9 |
|---|---|---|---|---|---|---|---|
| NCM | 95 | 95 | 95 | 95 | 95 | 95 | 95 |
| Acetylene black | 5 | 5 | 5 | 5 | 5 | 5 | 5 |
| Crosslinked Type | R-1 | R-2 | R-3 | R-4 | R-5 | R-19 | Carbopol 980 |
| polymer Parts | 1.5 | 1.5 | 1.5 | 1.5 | 1.5 | 1.5 | 1.5 |
| Ion-exchange water | 110 | 110 | 110 | 110 | 110 | 110 | 110 |
| Mixture layer slurry concentration | 48.0% | 48.0% | 48.0% | 48.0% | 48.0% | 48.0% | 48.0% |
| Coating properties | A | B | A | A | A | B | B |
| Peel strength N/m | 8.2 | 7.1 | 11.5 | 10.7 | 12.1 | 3.8 | 4.2 |
| Flex resistance | B | B | A | A | A | C | C |

Examples 1 to 29 involve electrode mixture layer compositions containing binders for nonaqueous electrolyte secondary battery electrodes of the present teachings and electrodes prepared using these. The coating properties of each mixture layer composition (slurry) were good, and the peel strength between the mixture layer and the collector of the resulting electrode was high in all cases, indicating excellent binding ability. The flex resistance of the electrodes was also confirmed to be at an acceptable level.

With the crosslinked polymers (salts) R-19 to 21, on the other hand, the particle size is large in a 1 mass % NaCl aqueous solution, and there appear to be many secondary aggregates of polymer particles. When such a crosslinked polymer (salt) was used as a binder, the peel strength of the mixture layer was low, and the flex resistance of the electrode was also inadequate (Comparative Examples 1 and 3 to 8). Similarly, satisfactory effects were not obtained in terms of binding ability when using a commercial crosslinked polyacrylic powder (Comparative Examples 2 and 9).

INDUSTRIAL APPLICABILITY

Because the binder for a nonaqueous electrolyte secondary battery electrode of the present teaching exhibits excellent binding ability in a mixture layer, a nonaqueous electrolyte secondary battery provided with an electrode obtained using this binder is expected to have good durability (cycle characteristics) even after repeated high-rate charge and discharge, and should be applicable to vehicle-mounted secondary batteries.

Moreover, the binder of the present teachings can also impart good flex resistance to an electrode mixture layer. Consequently, it can help to reduce troubles and increase yield during electrode manufacture.

The invention claimed is:

1. A composition, comprising:
a crosslinked polymer having a carboxyl group, or salt thereof, and
an active material,
wherein the crosslinked polymer comprises a structure derived from an ethylenically unsaturated carboxylic acid monomer in an amount of 50 to 100 mass % of total structural units of the crosslinked polymer and
wherein the crosslinked polymer is structured such that when a hydrogel of a neutralized form of the crosslinked polymer is circulated in a NaCl dispersion medium, the neutralized form of the crosslinked polymer has a volume-based median diameter of 0.1 to 7.0 µm, the volume-based median diameter being measured by analyzing the circulated medium via a laser diffraction/scattering particle size distribution measuring method, where the circulated medium contains a 1 mass % NaCl aqueous solution as a dispersion medium and an effective amount of the hydrogel of the neutralized form of the crosslinked polymer to obtain an operative scattered light intensity, wherein
the neutralized form of the crosslinked polymer is neutralized to a degree of neutralization of 80 to 100 mol %, and
the hydrogel contains 0.5 mass % of the 80 to 100 mol % neutralized form of the crosslinked polymer.

2. The composition according to claim 1, wherein the volume-based median diameter is 0.1 to 5.8 µm.

3. The composition according to claim 1, wherein the volume-based median diameter is 0.9 to 5.8 µm.

4. The composition according to claim 1, further comprising an aqueous medium.

5. The composition according to claim 1, wherein the crosslinked polymer is structured such that when the crosslinked polymer is neutralized to a degree of a neutralization of 60 to 95 mol %:
a 1 mass % aqueous solution of the 60 to 95 mol % neutralized crosslinked polymer has a viscosity that is equal to or less than 500 m·Pas, whereas
a 3 mass % aqueous solution of the 60 to 95 mol % neutralized crosslinked polymer has a viscosity that is equal to or more than 5,000 mPa·s.

6. The composition according to claim 1, wherein the crosslinked polymer or salt thereof has a crosslinked unit derived from at least one polyfunctional allyl ether compounds selected from the group consisting of trimethylolpropane diallyl ether, trimethylolpropane triallyl ether, pentaerythritol diallyl ether and pentaerythritol triallyl ether.

7. The composition according to claim 1, wherein the volume-based median diameter is 0.1 to 5.8 µm,
wherein the crosslinked polymer is structured such that:
when the crosslinked polymer is neutralized to a degree of a neutralization of 80 to 100 mol %, the 80 to 100 mol % neutralized crosslinked polymer can swell in water and make a stable dispersed state formed substantially of dispersed primary particles, and
when the crosslinked polymer is neutralized to a degree of a neutralization of 60 to 95 mol %:
a 1 mass % aqueous solution of the 60 to 95 mol % neutralized crosslinked polymer has a viscosity that is equal to or less than 500 mPa·s, whereas
a 3 mass % aqueous solution of the 60 to 95 mol % neutralized crosslinked polymer has a viscosity that is equal to or more than 5,000 mPa·s;
wherein the crosslinked polymer or salt thereof has a crosslinked unit derived from at least one polyfunctional allyl ether compounds selected from the group consisting of trimethylolpropane diallyl ether, trimethylolpropane triallyl ether, pentaerythritol diallyl ether and pentaerythritol triallyl ether.

8. The composition according to claim 1, wherein the crosslinked polymer or salt thereof is produced by polymerizing a non-crosslinkable monomer composition comprising an ethylenically unsaturated carboxylic acid monomer in the amount of 50 to 100 mass % of the non-crosslinkable monomer composition and a crosslinkable monomer in the amount of 0.02 to 7 mol % of the total amount of the non-crosslinkable monomer composition by precipitation-polymerizing,
wherein the precipitation-polymerizing is performed in a polymerization medium containing at least acetonitrile and 0.05 to 10.0 mass % of water to the total mass of the polymerization medium,
wherein a polymerization initiator is used in the amount of 0.001 to 2 mass parts of the total amount of the non-crosslinkable monomer composition, and
wherein the crosslinkable monomer is at least one polyfunctional allyl ether compounds selected from the group consisting of trimethylolpropane diallyl ether, trimethylolpropane triallyl ether, pentaerythritol diallyl ether and pentaerythritol triallyl ether.

9. The composition according to claim 1, wherein the crosslinked polymer comprises a structure derived from an ethylenically unsaturated carboxylic acid monomer in an amount of 60 to 100 mass % of total structural units of the crosslinked polymer;
wherein the crosslinked polymer is structured such that when the crosslinked polymer is neutralized to a degree of a neutralization of 80 to 95 mol %:
the volume-based median diameter of the 80 to 95 mol % neutralized crosslinked polymer is 0.1 to 5.8 µm,
the 80 to 95 mol % neutralized crosslinked polymer can swell in water and make a stable dispersed state formed substantially of dispersed primary particles, and
a 1 mass % aqueous solution of the 80 to 95 mol % neutralized crosslinked polymer has a viscosity that is equal to or less than 50,000 mPa·s, whereas a 3 mass % aqueous solution of the 80 to 95 mol % neutralized crosslinked polymer has a viscosity that is equal to or more than 5,000 mPa·s; and
wherein the crosslinked polymer or salt thereof has a crosslinked unit derived from at least one polyfunctional allyl ether compounds selected from the group consisting of trimethylolpropane diallyl ether, trimethylolpropane triallyl ether, pentaerythritol diallyl ether and pentaerythritol triallyl ether.

10. The composition according to claim 1, comprising either a carbon material or a silicon material as a negative electrode active material.

11. The composition according to claim 1, comprising a lithium-containing metal oxide as a positive electrode active material.

12. A nonaqueous electrolyte secondary battery electrode, comprising, on a surface of a collector side, a mixture layer comprising the composition according to claim 1.

13. A composition, comprising:
a crosslinked polymer having a carboxyl group, or salt thereof,
an active material, and
water,
wherein
the crosslinked polymer or salt thereof has a crosslinked unit derived from at least one polyfunctional allyl ether compounds selected from the group consisting of trimethylolpropane diallyl ether, trimethylolpropane triallyl ether, pentaerythritol diallyl ether and pentaerythritol triallyl ether; and
the crosslinked polymer is structured such that:
(i) when a hydrogel of a neutralized form of the crosslinked polymer is circulated in a NaCl dispersion medium the neutralized form of the crosslinked polymer has a volume-based median diameter of 0.1 to 7.0 µm, the volume-based median diameter being measured by analyzing the circulated medium via a laser diffraction/scattering particle size distribution measuring method, where the circulated medium contains a 1 mass % NaCl aqueous solution as a dispersion medium and an effective amount of the hydrogel of the neutralized form of the crosslinked polymer to obtain an operative scattered light intensity, wherein
the neutralized form of the crosslinked polymer is neutralized to a degree of neutralization of 80 to 100 mol %, and
the hydrogel contains 0.5 mass % of the 80 to 100 mol % neutralized form of the crosslinked polymer;
(ii) when the crosslinked polymer is neutralized to a degree of a neutralization of 80 to 100 mol % and the 80 to 100 mol % neutralized crosslinked polymer is present in an aqueous medium, the 80 to 100 mol % neutralized crosslinked polymer swells to form a stable dispersed state of dispersed water-swollen primary particles; and
(iii) when the crosslinked polymer is neutralized to a degree of a neutralization of 60 to 95 mol %:
a 1 mass % aqueous solution of the 60 to 95 mol % neutralized crosslinked polymer has a viscosity that is equal to or less than 500 mPa·s, whereas
a 3 mass % aqueous solution of the 60 to 95 mol % neutralized crosslinked polymer has a viscosity that is equal to or more than 5,000 mPa·s.

14. A method of manufacturing a crosslinked polymer or salt thereof, comprising:
polymerizing a non-crosslinkable monomer composition comprising an ethylenically unsaturated carboxylic acid monomer 50-100 mass % of the non-crosslinkable monomer composition and a crosslinkable monomer in the amount of 0.02 to 7 mol % of the total amount of the non-crosslinkable monomer composition by precipitation-polymerizing using a condition effective to obtain a primary chain length and degree of crosslinking so that a resulting crosslinked polymer has a volume-based median diameter of 0.1 to 7.0 μm, and separating the crosslinked polymer or salt thereof from the polymerizing dispersion to obtain the resulting crosslinked polymer; wherein the volume-based median diameter is measured via a laser diffraction/scattering particle size distribution measuring method in which a circulated medium is analyzed, the circulated medium comprising:
- an effective amount of a hydrogel of a neutralized form of the resulting crosslinked polymer to obtain an operative scattered light intensity, and
- a 1 mass % NaCl aqueous solution as a dispersion medium, wherein
  - the neutralized form of the crosslinked polymer is neutralized to a degree of neutralization of 80 to 100 mol %, and
  - the hydrogel contains 0.5 mass % of the 80 to 100 mol % neutralized form of the crosslinked polymer.

15. The method according to claim 14, wherein the polymerizing uses a polymerization medium containing at least acetonitrile.

16. The method according to claim 15, wherein the polymerization medium further contains 0.05 to 10.0 mass % of water to the total mass of the polymerization medium.

17. The method according to claim 14, wherein a polymerization initiator is used in the amount of 0.001 to 2 mass parts of the total amount of the non-crosslinkable monomer composition.

18. The method according to claim 14, wherein the crosslinkable monomer is at least one polyfunctional allyl ether compounds selected from the group consisting of trimethylolpropane diallyl ether, trimethylolpropane triallyl ether, pentaerythritol diallyl ether and pentaerythritol triallyl ether.

19. The method according to claim 14, wherein the degree of neutralization of the ethylenically unsaturated carboxylic acid monomer in the polymerizing is equal to or less than 10 mol %.

20. The method according to claim 19 further comprising:
neutralizing the crosslinked polymer following the polymerizing by adding an alkali compound to the polymerizing dispersion.

21. The method according to claim 14, wherein the polymerizing uses a polymerization medium containing at least acetonitrile, wherein the degree of neutralization of the ethylenically unsaturated carboxylic acid monomer in the polymerizing is equal to or less than 10 mol %, further comprising:

neutralizing the crosslinked polymer following the polymerizing and before the separating by adding an alkali compound to the polymerizing dispersion, and washing the crosslinked polymer or salt thereof after the separating, and wherein the polymerizing uses a polymerization initiator in the amount of 0.001 to 2 mass parts of the total amount of the non-crosslinkable monomer composition.

* * * * *